United States Patent [19] [11] Patent Number: 4,833,235
Pedrazzi [45] Date of Patent: May 23, 1989

[54] SULFO GROUP-CONTAINING DISAZO COMPOUNDS HAVING A HETEROCYCLIC COUPLING COMPONENT RADICAL

[75] Inventor: Reinhard Pedrazzi, Allschwil, Switzerland

[73] Assignee: Sandoz Ltd., Basel, Switzerland

[21] Appl. No.: 106,100

[22] Filed: Oct. 7, 1987

Related U.S. Application Data

[63] Continuation-in-part of Ser. No. 856,606, Apr. 25, 1986, abandoned.

[30] Foreign Application Priority Data

Apr. 26, 1985 [DE] Fed. Rep. of Germany ....... 3515083

[51] Int. Cl.⁴ .................. C09B 31/14; C09B 31/147; C09B 31/153; C09B 44/08
[52] U.S. Cl. ...................................... 534/608; 8/549; 8/564; 8/571; 8/574; 8/585; 8/602; 8/603; 8/609; 8/611; 8/641; 8/917; 534/583; 534/599; 534/635; 534/637; 534/638; 534/728; 534/737; 534/738; 534/741; 534/756; 534/759; 534/763; 534/764; 534/856; 534/860
[58] Field of Search .............. 534/637, 741, 744, 856, 534/756, 759, 603, 608, 806, 737, 738, 763, 767

[56] References Cited

U.S. PATENT DOCUMENTS

| | | | |
|---|---|---|---|
| 1,667,312 | 4/1928 | Fritche et al. | 534/637 |
| 1,739,031 | 12/1929 | Hitch et al. | 534/744 X |
| 1,878,471 | 9/1932 | Dobmaier | 534/744 |
| 2,544,087 | 3/1951 | Hindermann | 534/744 X |
| 2,727,886 | 12/1955 | Grandjean | 534/753 X |
| 3,040,021 | 6/1962 | Gunst | 534/759 |
| 4,102,880 | 7/1978 | Seitz | 534/603 X |
| 4,269,769 | 5/1981 | Moiso et al. | 534/759 X |
| 4,623,720 | 11/1986 | Holliger | 534/700 |

FOREIGN PATENT DOCUMENTS

| | | | |
|---|---|---|---|
| 2357611 | 2/1978 | France | 534/744 |
| 533161 | 1/1973 | Switzerland | 534/740 |
| 633790 | 12/1949 | United Kingdom | 534/768 |

OTHER PUBLICATIONS

Colour Index, 3rd Edition, pp. 4267 to 4270, 6400, and 7278 to 7279 (CI 29000 to 29090) (1971).

Primary Examiner—Floyd D. Higel
Attorney, Agent, or Firm—Gerald D. Sharkin; Richard E. Vila; Melvin M. Kassenoff

[57] ABSTRACT

Disazo compounds of the formula

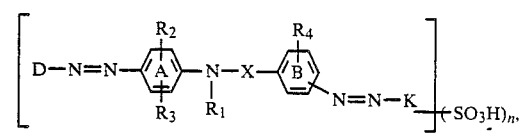

and salt thereof,

D is the radical of a diazo component of the benzene or naphthalene series.

K is the radical of a heterocyclic coupling component of the aminopyrazole-, pyridone- or barbituric acid-series, n is 1 to 4, $R_1$ is hydrogen, $C_{1-4}$alkyl or substituted $C_{1-4}$alkyl, each of $R_2$ and $R_3$ is independently hydrogen, halo, $C_{1-4}$alkyl, substituted $C_{1-4}$alkyl, $C_{1-4}$alkoxy, substituted $C_{1-4}$alkoxy, —NHCO—$R_5$, amino, substituted amino or a quaternary ammonium group, wherein $R_5$ is $C_{1-4}$alkyl, substituted $C_{1-4}$alkyl, $C_{1-4}$alkoxy or amino, $R_4$ is hydrogen, $C_{1-4}$alkyl, $C_{1-4}$alkoxy, halo or nitro, X is a bridging radical, and with the proviso that the number of anionic groups equals or exceeds the total number of basic and cationic groups, are useful as direct dyes, as such or in the form or solid or particularly liquid aqueous dye preparations, for dyeing or printing hydroxy group- or nitrogen- containing organic substrates, such as textiles consisting of or containing cellulose material, leather, glass and especially paper, and are also useful in inks.

32 Claims, No Drawings

SULFO GROUP-CONTAINING DISAZO COMPOUNDS HAVING A HETEROCYCLIC COUPLING COMPONENT RADICAL

This is a continuation-in-part of application Ser. No. 06/856,606, filed Apr. 25, 1986 and now abandoned.

The invention relates to disazo compounds containing sulphonic acid groups and salts thereof and to a process for their preparation, which compounds are suitable for use as direct dyestuffs as such or in the form of dyeing preparations.

According to the invention there is provided compounds of formula I

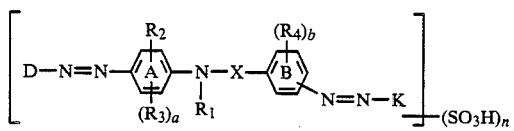

and salts thereof, in which

D is the radical of a diazo component of the benzene or naphthalene series,
X is a bridging group,
K is the radical of a heterocyclic coupling component of the aminopyrazole-, pyridone- or barbituric acid-series,
n is 1, 2, 3 or 4, each of a and b is independently 0 or 1,
$R_1$ is hydrogen, $C_{1-4}$alkyl or substituted $C_{1-4}$alkyl, each of $R_2$ and $R_3$ is independently hydrogen, halogen, $C_{1-4}$alkyl, substituted $C_{1-4}$alkyl, $C_{1-4}$alkoxy, substituted $C_{1-4}$alkoxy, —NHCOR$_5$, amino or a substituted amino or quaternary ammonium group,
$R_4$ is hydrogen, $C_{1-4}$alkyl, $C_{1-4}$alkoxy, halogen or nitro, and
$R_5$ is $C_{1-4}$alkyl, substituted $C_{1-4}$alkyl, $C_{1-4}$alkoxy or amino, and mixtures of such compounds each of which is in free acid or salt form.

In a compound of formula I n is preferably at least 2. Preferably, D contains at least one sulphonic acid group, and additionally to that each of the rings A and B (provided that a and b, respectively, are 0) and K may also contain a sulphonic acid group. More preferably, D contains two or three sulphonic acid groups, most preferably two of them.

In a compound of formula I the total number of any basic and/or cationic groups, e.g. any protonatable amino and/or quaternary ammonium groups, equals or is less than the total number of anionic groups, i.e. the sulpho and carboxy groups present. Depending on the reaction and isolation conditions used for a compound of formula I, the positive charge of each cationic group is balanced either by the negative charge of an anionic groups $SO_3^\ominus$ or $COO^\ominus$ or even by $O^\ominus$ forming an internal salt, or by an external anion $An^\ominus$, where $An^\ominus$ is a non-chromophoric anion, such as hydroxide, chloride, bromide, lactate, acetate, propionate, citrate, oxalate, methyl sulphate, ethyl sulphate and hydrogensulphate; most preferably it is a chloride ion.

The term "salt form" encompasses internal and external salt forms as well as acid addition salt forms.

In the case where a compound of formula I is free of basic and cationic groups it is in free acid or external salt form. Where it is free of basic groups, and the total number of cationic groups (a) equals or (b) is less than the total number of anionic groups, normally an internal salt is formed, or both groups may be in external salt form, and for (b) the surplus anionic group(s) is (are) in free acid or preferably external salt form. Where it is free of cationic groups, and the total number of basic groups (c) equals or (d) is less than the total number of anionic groups, normally an internal salt is formed and for (d) the surplus anionic group(s) is (are) in free acid or preferably external salt form, or the anionic groups may be in external salt form, and the basic group may be in free base or acid addition salt form with an acid HAn, where $An^\ominus$ is a non-chromophoric anion, and the surplus anionic group(s) is (are) in external salt form. In principle, the same applies where both basic groups and cationic groups are present.

In the specification any halogen means fluorine, chlorine or bromine, especially chlorine.

Generally, any alkyl or akylene is linear or branched unless indicated to the contrary.

D is preferably Da, where Da is a group of formula (a), (b) or (c),

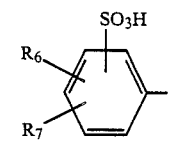

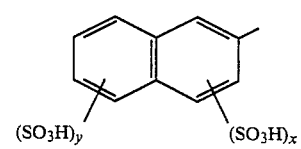

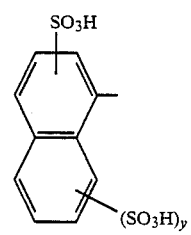

in which
$R_6$ is hydrogen or sulpho,
$R_7$ is hydrogen, halogen, $C_{1-4}$alkyl, $C_{1-4}$alkoxy or —NHCOC$_{1-4}$alkyl,
x is 0 or 1 and
y is 1 or 2.

More preferaby, D is Db, where Db is a group of formula (a$_1$), (b$_1$) or (c$_1$),

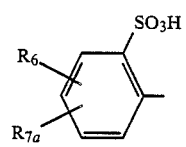

in which $R_{7a}$ is hydrogen, chlorine, methyl, methoxy or acetamido;

(b$_1$) is a group of formula (b) in which x+y is 2, the sulpho groups are bound to the 1,5-, 3,6-, 4,8-, 5,7- or 6,8-positions, and when x+y is 3, the sulpho groups are bound to the 3,6,8- or 4,6,8-positions;

(c$_1$) is a group of formula (c) in which when y is 1, the sulpho groups are in the 3,6-, 4,6-, 3,8- or 4,8-positions, and when y is 2 the sulpho groups are in the 3,6,8-positions.

Even more preferably, D is Dc, where Dc is a group of formula (a₂) or (b₂),

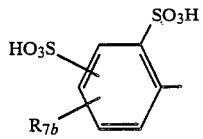 (a₂)

in which R₇ᵦ is hydrogen, methyl or methoxy;

(b₂) is a group of formula (b) in which x+y is 2 with the sulpho groups bound to the 4,8- or 6,8-positions.

Particularly preferred as D is Dd, where Dd is a group of formula (b₂) of which a 6,8-disulphonaphthyl-2 group is most preferred.

Preferably, X is Xa, where Xa is —C0—, —CH₂—, —SO₂—, —CONR₁— or

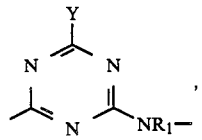

in which Y is halogen, hydroxy, amino, $C_{1-4}$alkyl, phenoxy or an aliphatic, cycloaliphatic, aromatic or heterocyclic amino group, the latter of which is C- or N-bonded containing 1 to 3 hetero atoms and which may be substituted by 1 to 3 $C_{1-4}$alkyl groups, any such substituted amino group preferably being $C_{1-2}$alkylamino, $C_{2-4}$hydroxyalkylamino, N,N-di-($C_{2-4}$hydroxyalkyl)amino, —NH—(CH₂)$_m$—SO₃H, anilino, morpholino, piperidino, piperazino or N-methylpiperazino, wherein m is 2 or 3. Y$_x$ is Y wherein any substituted amino group has one of these significances. Preferably, Y is Y$_a$, where Y$_a$ is chlorine, hydroxy, methoxy, amino, mono-$C_{1-2}$alkylamino, monohydroxy-$C_{2-4}$alkylamino, di-(hydroxy-$C_{2-4}$alkyl)amino, —NH(CH₂)$_{2-3}$SO₃H, anilino, morpholino, piperidino, piperazino or N-methylpiperazino, and R₁ is R$_{1a}$, more preferably R$_{1b}$, where R$_{1a}$ and R$_{1b}$ are as defined below.

More preferably, X is Xb, where Xb is —CO—, —CH₂—, —CONR$_{1a}$— or

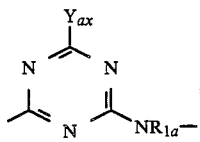

in which Y$_{ax}$ has one of the significances given for Y$_a$ except chlorine.

Even more preferably, X is Xc, where Xc is —CO—, —SO₂— or

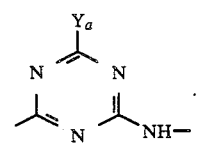

Even more preferably, X is Xd, where Xd is —C0— or

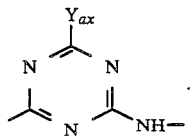

Most preferably X is —CO—.

K is preferably Ka, where Ka is a group of formula (d), (e) or (f),

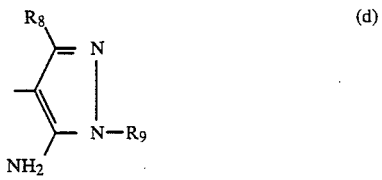 (d)

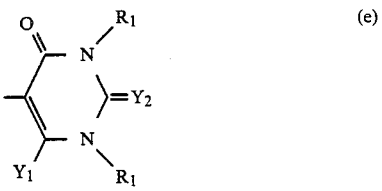 (e)

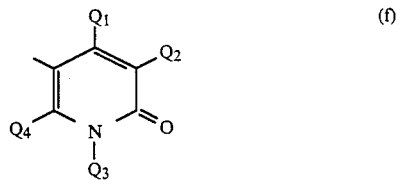 (f)

in which
Y₁ is OH or NH₂,
R₈ is $C_{1-4}$alkyl, $C_{1-4}$alkoxy, NH₂, —CONH₂, —COOR₁, phenyl or substituted phenyl,
R₉ is hydrogen, $C_{1-4}$alkyl, phenyl or substituted phenyl,
Y₂ is O, S, =NH, =N—CN, =NCONH₂ or

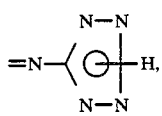

Q₁ is hydrogen, CN, NH₂, —NHC$_{1-4}$alkyl, OH, $C_{1-4}$alkoxy, $C_{1-4}$alkyl, $C_{2-4}$alkyl monosubstituted by hydroxy or $C_{1-4}$alkoxy, $C_{5-6}$cycloalkyl or phenyl or phenyl($C_{1-4}$alkyl) which phenyl group of the latter two groups is unsubstituted or substituted by one to three groups selected from $C_{1-4}$alkyl, $C_{1-4}$alkoxy, halogen, COOH and SO₃H; a saturated or unsaturated 5- or 6-membered heterocyclic ring containing one to three hetero atoms which ring is unsubstituted or substituted by one to three $C_{1-4}$alkyl groups and which is bound by a carbon or nitrogen atom directly or via a bridge member provided that any

is bound via bridge member; —COR$_{10}$ or —(CH$_2$)$_{1-3}$R$_{11}$,

R$_{10}$ is OH, NH$_2$ or C$_{1-4}$alkoxy,

R$_{11}$ is CN, halogen, SO$_3$H, —OSO$_3$H, —COR$_{12}$ or

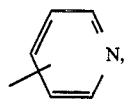

R$_{12}$ is OH; NH$_2$; C$_{1-4}$alkyl which is unsubstituted or monosubstituted by OH, halogen, CN or C$_{1-4}$alkoxy; or phenoxy, phenyl or phenyl(C$_{1-4}$alkyl) which phenyl group of the latter three groups is unsubstituted or substituted by one to three groups selected from C$_{1-4}$alkyl, C$_{1-4}$alkoxy, halogen, COOH and SO$_3$H;

Q$_2$ is hydrogen; CN; halogen; SO$_3$H; NO; NO$_2$; —NR$_{13}$R$_{14}$; C$_{1-4}$alkyl which is unsubstituted or monosubstituted by OH, halogen, CN, C$_{1-4}$alkoxy, phenyl, SO$_3$H or —OSO$_3$H; —SO$_2$NH$_2$; —COR$_{15}$; —CH$_2$NHCOR$_{16}$E$_1$; a group of the formula

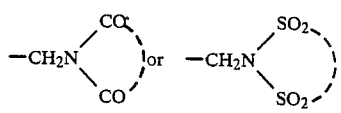

in which the carbonyl or sulphonyl groups are bound to two carbon atoms of an aromatic ring which are in ortho position to each other; a group containing the moiety

in which the ammonium ion is part of a 5- or 6-membered ring which contains one to three hetero atoms and which is unsubstituted or substituted by one or two methyl groups by one of the groups NH$_2$, —NHC$_{1-4}$alkyl and —N(C$_{1-4}$alkyl)$_2$; or a group of the formula

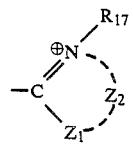

in which

R$_{17}$ is hydrogen or C$_{1-4}$alkyl which is unsubstituted or monsubstituted by OH, halogen, CN, C$_{1-4}$alkoxy or phenyl, Z$_1$ is S,

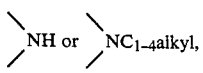

and

Z$_2$ is a group necessary to form a 5- or 6-membered ring to which ring a further 5- or 6-membered carbocyclic or heterocyclic ring containing one or two hetero atoms may be condensed, or both Q$_1$ and Q$_2$ together form a C$_3$- or C$_4$-chain which may be part of a further 5- or 6-membered ring by two vicinal chain members, each of R$_{13}$ and R$_{14}$ is independently hydrogen, C$_{1-4}$alkyl which is unsubstituted or monosubstituted by OH, halogen, CN, C$_{1-4}$alkoxy or phenyl; or —COR$_{16}$E$_1$, R$_{15}$ is OH, NH$_2$, —NHC$_{1-4}$alkyl, —N(C$_{1-4}$alkyl)$_2$, C$_{1-4}$alkyl, C$_{1-4}$alkoxy, phenyl or phenoxy which phenyl group of the latter two groups is unsubstituted or substituted by one to three groups selected from C$_{1-4}$alkyl, C$_{1-4}$alkoxy, halogen, COOH and SO$_3$H, R$_{16}$ is C$_{1-6}$alkylene, E$_1$ is hydrogen, halogen, a protonatable amino group, a quaternary ammonium group or a hydrazinium group, SO$_3$H or —OSO$_3$H;

Q$_3$ is hydrogen; —NR$_{18}$R$_{19}$; a saturated or unsaturated 5- or 6-membered heterocyclic ring containing one or two hetero atoms which is bound by a carbon or nitrogen atom and which is unsubstituted or substituted by up to three methyl groups or by one of the groups NH$_2$, —NHC$_{1-4}$alkyl and —N(C$_{1-4}$alkyl)$_2$; C$_{1-6}$alkyl; C$_{2-4}$alkenyl; C$_{2-4}$alkynyl; C$_{1-6}$alkyl monosubstituted by OH, CN, C$_{1-4}$alkoxy, acetamido, —COR$_{20}$, SO$_3$H or —OSO$_3$H; C$_{5-6}$cycloalkyl; phenyl or phenyl(C$_{1-4}$alkyl) which phenyl group of the latter two groups is unsubstituted or substituted by one to three groups selected from C$_{1-4}$alkyl, C$_{1-4}$alkoxy, halogen, NO$_2$, NH$_2$, COOH and SO$_3$H; —C$_{1-6}$alkylene-E$_2$,

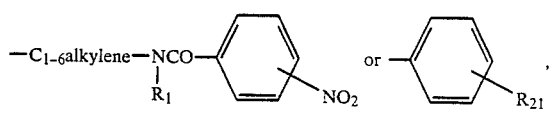

each of R$_{18}$ and R$_{19}$ is independently hydrogen, C$_{1-4}$alkyl, C$_{1-4}$alkyl monosubstituted by OH, halogen, CN or C$_{1-4}$alkoxy; phenyl or phenyl substituted by one or two groups selected from halogen, C$_{1-4}$alkyl and C$_{1-4}$alkoxy, R$_{20}$ is OH or C$_{1-4}$alkoxy, E$_2$ is a protonatable amino group, a quaternary ammonium group, a hydrazinium group or a group

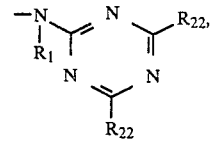

R$_{21}$ is E$_3$, —NHCOR$_{16}$E$_3$, —SO$_2$NHR$_{16}$E$_3$ or —CONHR$_{16}$E$_3$, each R$_{22}$ is independently halogen, NH$_2$ or an aliphatic amino group, and E$_3$ is a protonatable amino group, a quaternary ammonium group or a hydrazinium group; and Q$_4$ is hydrogen or OH with the proviso that Q$_4$ is hydrogen when Q$_1$ is OH.

Any substituted C$_{1-4}$alkyl as R$_1$ is preferably C$_{1-4}$alkyl monosubstituted by hydroxy, chloro, cyano, carboxy or sulpho. Accordingly, R$_1$ is, for example, R$_{1x}$, where R$_{1x}$ is hydrogen, C$_{1-4}$alkyl or C$_{1-4}$alkyl monosubstituted by hydroxy, chloro, cyano, carboxy or sulpho.

$R_1$ is preferably $R_{1a}$, where $R_{1a}$ is hydrogen, methyl, ethyl or $C_{1-3}$alkyl monosubstituted by hydroxy, chlorine, cyano, carboxy or sulpho. More preferably, it is $R_{1b}$, where $R_{1b}$ is hydrogen, methyl or ethyl; most preferably, $R_1$ is hydrogen.

$Y_1$ is preferably OH.

$R_8$ is preferably $R_{8a}$, where $R_{8a}$ is methyl, methoxy, —$CONH_2$, —COOH, —$COOC_{1-2}$alkyl or phenyl. More preferably $R_8$ is $R_{8b}$, where $R_{8b}$ is methyl, —COOH or —$CONH_2$; most preferably $R_8$ is methyl.

$R_9$ is preferably $R_{9a}$, where $R_{9a}$ is hydrogen, methyl, phenyl or phenyl substituted by one or two groups selected from $C_{1-4}$alkyl, $C_{1-4}$alkoxy, chlorine, acetamido, —$NHCOR_{16}B_2$, —$SO_2NHR_{16}B_2$ (which $B_2$ in the latter two groups is as defined below), carboxy and sulpho. More preferably, $R_9$ is $R_{9b}$, where $R_{9b}$ is phenyl or phenyl substituted by one or two groups selected from methyl, methoxy, chlorine and sulpho.

The group (d) is preferably $(d_1)$ of the formula

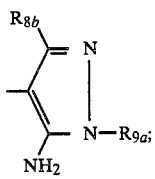

especially $(d_2)$ of the formula

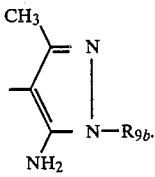

The group (e) is preferably $(e_1)$ of the formula,

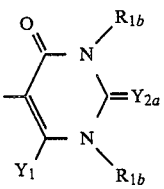

in which $Y_{2a}$ is O, S, =NH, =HCH or =$NCONH_2$; especially $(e_2)$ of the formula,

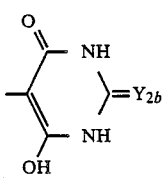

in which $Y_{2b}$ is =NCN or =$NCONH_2$.

Any alkyl or alkoxy as $Q_1$ preferably contains 1 or 2 carbon atoms and is most preferably methyl or methoxy. Any substituted alkyl is preferably a $C_{2-3}$alkyl group monosubstituted by hydroxy or $C_{1-2}$alkoxy. Any cycloalkyl is preferably cyclohexyl.

Preferably, in any substituted phenyl or phenylalkyl group the phenyl group contains one or two groups selected from methyl, methoxy, chlorine, —COOH and —$SO_3H$.

Any heterocyclic ring as $Q_1$ is preferably morpholine, pyrrolidine, piperidine, piperazine or N-methylpiperazine (when saturated) which is bound by a carbon or nitrogen atom, or is pyridine, triazine, pyridazine, pyrimidine or pyrazine (when unsaturated) which is bound by a carbon or nitrogen atom where in the latter case (when bound by a nitrogen atom) a methylene bridge is present.

$R_{10}$ is preferably $R_{10a}$, where $R_{10a}$ is OH, $NH_2$, methoxy or ethoxy. More preferably it is $R_{10b}$, where $R_{10b}$ is OH or $NH_2$.

$R_{12}$ is preferably $R_{12a}$, where $R_{12a}$ is OH, $NH_2$, methyl, ethyl, methoxy or ethoxy. More preferably it is $R_{12b}$, where $R_{12b}$ is OH or $NH_2$.

$R_{11}$ is preferably $R_{11a}$, where $R_{11a}$ is CN, chlorine, $SO_3H$, —$OSO_3H$,

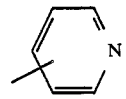

or —$COR_{12a}$. More preferably it is $R_{11b}$, where $R_{11b}$ is $SO_3H$, —$OSO_3H$,

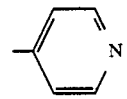

or —$COR_{12b}$.

$Q_1$ is preferably $Q_{1a}$, where $Q_{1a}$ is hydrogen, CN, $NH_2$, OH, methyl, ethyl, 2-hydroxyethyl, 2-$C_{1-2}$alkoxyethyl, methoxy, ethoxy, cyclohexyl; phenyl or phenyl-$C_{1-2}$alkyl which phenyl group of the latter two groups is unsubstituted or substituted by one or two groups selected from methyl, methoxy, chlorine, COOH and $SO_3H$;

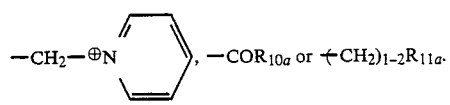

More preferably $Q_1$ is $Q_{1b}$, where $Q_{1b}$ is $NH_2$, methyl, ethyl, 2-hydroxyethyl, cyclohexyl, phenyl, phenyl-$C_{1-2}$alkyl, —$COR_{10b}$ or —$CH_2R_{11b}$. Even more preferably $Q_1$ is $Q_{1c}$, where $Q_{1c}$ is $NH_2$, methyl, phenyl, phenylethyl or —$CH_2SO_3H$. Most preferably $Q_1$ is methyl.

Any protonatable amino or quaternary ammonium group as $E_1$, $E_2$ or $E_3$ is preferably a group $B_1$, where $B_1$ is a primary amino group, a secondary or tertiary aliphatic, cycloaliphatic, aromatic or saturated, unsaturated or partially unsaturated heterocyclic amino group which latter group is attached by the N-atom or a carbon atom; or a quaternary ammonium group corresponding to the above.

Any aliphatic amino group as $B_1$ is preferably a mono-$C_{1-4}$-alkyl- or a di-($C_{1-4}$alkyl)-amino group. The alkyl group may be monosubstituted by halogen, hydroxy, cyano, $C_{1-4}$alkoxy or phenyl. Any cycloaliphatic amino groups is preferably $C_{5-6}$cycloalkylamino, the cycloalkyl group of which is unsubstituted or may be substituted by one or two $C_{1-2}$alkyl groups.

Any aromatic amino group is preferably phenylamino, the phenyl ring of which is unsubstituted or substituted by one or two groups selected from halogen, $C_{1-4}$alkyl, $C_{1-4}$alkoxy, $SO_3H$ and COOH.

Any heterocyclic amino groups as $B_1$ which is attached by the N-atom or a carbon atom is preferably a saturated, unsaturated or partially unsaturated 5- or 6-membered ring which contains one or two hetero atoms and may be substituted by one or two $C_{1-4}$alkyl groups.

$B_1$ is more preferably a group $B_2$, where $B_2$ is a protonatable amino group $—NR_{23}R_{24}$ or a quaternary ammonium group $—N^{\oplus}R_{25}R_{26}R_{27}$, each of $R_{23}$ and $R_{24}$, independently, is hydrogen, $C_{1-2}$alkyl, unbranched hydroxy-$C_{2-3}$alkyl or benzyl or both $R_{23}$ and $R_{24}$, together with the N-atom to which they are attached, form a pyrrolidine, piperidine, morpholine, piperazine or N-methylpiperazine group, each of $R_{25}$ and $R_{26}$ has independently one of the non-cyclic or cyclic significances of $R_{23}$ and $R_{24}$ except hydrogen, and $R_{27}$ is methyl, ethyl or benzyl, or $R_{25}$, $R_{26}$ and $R_{27}$, together with the N-atom to which they are attached, form a pyridinium group unsubstituted or substituted by one or two methyl groups.

Most preferably $B_1$ is $B_3$, where $B_3$ is $—NR_{23a}R_{24a}$ or $—N^{\oplus}R_{25a}R_{26a}R_{27a}$, each of $R_{23a}$ and $R_{24a}$ is hydrogen, methyl or ethyl, or both $R_{23a}$ and $R_{24a}$, together with the N-atom to which they are attached form a piperidine, morpholine, piperazine or N-methylpiperazine ring;

each of $R_{25a}$ and $R_{26a}$ is methyl or ethyl or both $R_{25a}$ and $R_{26a}$, together with the N-atom to which they are attached, has one of the cyclic significances of $R_{23a}$ and $R_{24a}$, $R_{27a}$ is methyl or ethyl or $R_{25a}$, $R_{26a}$ and $R_{27a}$, together with the N-atom to which they are attached, form a pyridinium group unsubstituted or substituted by one or two methyl groups.

$E_1$ is preferably $E_{1a}$, where $E_{1a}$ is hydrogen, chlorine, a group $B_2$ or $SO_3H$. More prefrerably it is $E_{1b}$, where $E_{1b}$ is hydrogen, chlorine, a group $B_3$ or $SO_3H$.

$R_{13}$ and $R_{14}$ are preferably $R_{13a}$ and $R_{14a}$, where each of $R_{13a}$ and $R_{14a}$ is independently hydrogen, $C_{1-2}$alkyl, $C_{1-2}$alkyl monosubstituted by OH, $C_{1-2}$alkoxy or phenyl, or $—COR_{16a}E_{1a}$, in which $R_{16a}$ is $C_{1-2}$alkylene. More preferably $R_{13}$ and $R_{14}$ are $R_{13b}$ and $R_{14b}$, where each of $R_{13b}$ and $R_{14b}$ is independently hydrogen, methyl or $—COR_{16a}E_{1b}$.

$R_{15}$ is preferably $R_{15a}$, where $R_{15a}$ is OH, $NH_2$, $—NHCH_3$, $—N(CH_3)_2$, methyl, ethyl, methoxy or ethoxy. More preferably it is $R_{15b}$, where $R_{15b}$ is $NH_2$, methyl, ethyl, methoxy or ethoxy.

$Q_2$ is preferably $Q_{2a}$, where $Q_{2a}$ is hydrogen, CN, chlorine, $SO_3H$, $—NR_{13b}R_{14b}$, methyl, ethyl, $C_{1-2}$alkyl monosubstituted by OH, phenyl, $SO_3H$ or $—OSO_3H$; $—COR_{15a}$, $—CH_2NHCOR_{16a}E_{1b}$ or a group which contains the moiety

forming a pyridine, pyrimidine or benzimidazole ring which is unsubstituted or monosubstituted by methyl, $NH_2$, $—NHCH_3$ or $—N(CH_3)_2$. More preferably it is $Q_{2b}$, where $Q_{2b}$ is hydrogen, CN, chlorine, $—NHR_{13b}$, $—CH_2SO_3H$, $—COR_{15b}$, $—CH_2NHCOCH_2E_{1b}$,

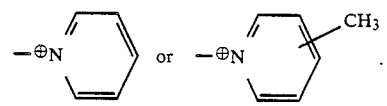

Even more preferably $Q_2$ is $Q_{2c}$, where $Q_{2c}$ is hydrogen, CN, chlorine, $—CONH_2$,

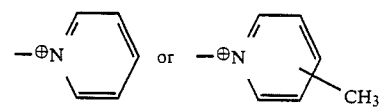

Most preferably $Q_2$ is hydrogen.

It is also preferred that $Q_1$ and $Q_2$ as $Q_{1a}$ and $Q_{2a}$ together with the carbon atoms to which they are attached form part of a further ring which corresponds to the formula

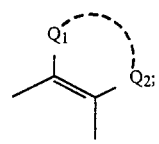

for example, they form a ring of the formula

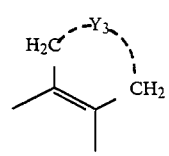

in which $Y_3$ is $—(CH_2)_{1-2}—$,

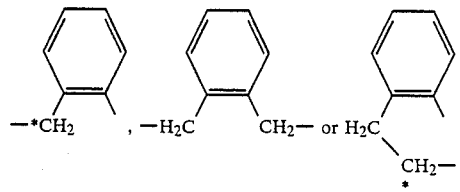

and the asterisked carbon atom is bound to the methylene group in the $Q_1$-position.

$R_{18}$ and $R_{19}$ are preferably $R_{18a}$ and $R_{19a}$, where each of $R_{18a}$ and $R_{19a}$ is independently hydrogen, methyl, ethyl or phenyl.

$R_{20}$ is preferably $R_{20a}$, where $R_{20a}$ is OH, methoxy or ethoxy.

Any aliphatic amino group as $R_{22}$ is preferably a mono-$C_{1-4}$alkyl- or di-($C_{1-4}$alkyl)-amino group, in which the alkyl groups may be monosubstituted by halogen, OH, CN, $C_{1-4}$alkoxy or phenyl.

Each $R_{22}$ is preferably $R_{22a}$, where each $R_{22a}$ is independently chlorine, $NH_2$, $—NHC_{1-2}$alkyl or $—N(C_{1-2}$alkyl$)_2$, in which the alkyl groups are unsubstituted or monosubstituted by OH, CN or $C_{1-2}$alkoxy. More preferably each $R_{22}$ is $R_{22b}$, where $R_{22b}$ is independently chlorine, $NH_2$, $—NHCH_3$, $—N(CH_3)_2$, $—NHCH_2C-H_2OH$ or $—N(CH_2CH_2OH)_2$.

$E_2$ is preferably $E_{2a}$, where $E_{2a}$ is a group $B_2$ or a group of the formula

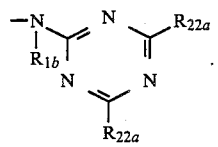

More preferably it is $E_{2b}$, where $E_{2b}$ is a group $B_3$ or a group of the formula

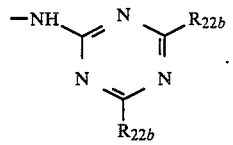

$E_3$ is preferably $E_{3a}$, where $E_{3a}$ is a group $B_2$; more preferably it is $E_{3b}$, where $E_{3b}$ is a group $B_3$.

$R_{21}$ is preferably $R_{21a}$, where $R_{21a}$ is $E_{3a}$, $-NH-COR_{16a}E_{3a}$, $-SO_2NHR_{16a}E_{3a}$ or $-CONHR_{16a}E_{3a}$. More preferably it is $R_{21b}$, where $R_{21b}$ is $E_{3b}$, $-NH-COCH_2E_{3b}$ or $-CONHCH_2E_{3b}$.

$Q_3$ is preferably $Q_{3a}$, where $Q_{3a}$ is hydrogen; $-NR_{18a}R_{19a}$; phenyl; phenyl—$C_{1-2}$alkyl; cyclohexyl; $C_{1-4}$alkyl; $C_{1-4}$alkyl mono-substituted by OH, CN, $C_{1-2}$alkoxy, $-COR_{20a}$, $SO_3H$ or $-OSO_3H$; —$C_{1-3}$alkylene-$E_{2a}$;

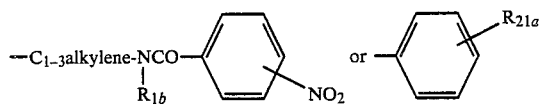

More preferably it is $Q_{3b}$, where $Q_{3b}$ is hydrogen, $-NHR_{18a}$, phenyl- —$C_{1-2}$alkyl; methyl; ethyl; $C_{1-2}$alkyl monosubstituted by OH, $SO_3H$ or $COR_{20a}$; —$(CH_2)_{1-3}$-$E_{2b}$;

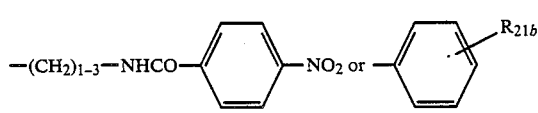

Most preferably $Q_3$ is hydrogen.

The group (f) is preferably (f$_1$) of the formula

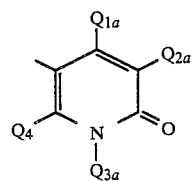

(f$_1$)

with the proviso that $Q_4$ is hydrogen when $Q_{1a}$ is OH; more preferably (f$_2$) of the formula

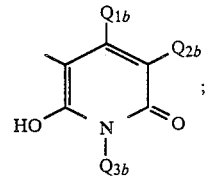

(f$_2$)

even more preferably (f$_3$) of the formula

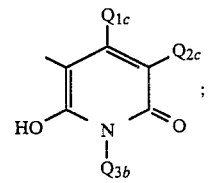

(f$_3$)

most preferably (f$_4$) of the formula

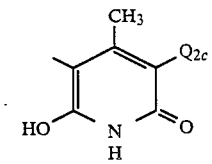

(f$_4$)

in which $Q_{2c}$ being hydrogen is especially preferred.

More preferably, K is $K_b$, where $K_b$ is a group (d$_1$), (e$_1$) or (f$_1$); even more preferably it is $K_c$, where $K_c$ is a group (d$_2$), (e$_1$) or (f$_2$); even more preferably it is $K_d$, where $K_d$ is a group (e$_1$) or (f$_3$); even more preferably, K is $K_e$, where $K_e$ is a group (e$_2$) or (f$_4$) in which $Q_{2c}$ being hydrogen is especially preferred; most preferably, K is $K_f$, where $K_f$ is a group (e$_2$).

In the ring A, $R_2$ and $R_3$ are preferably in para-position to each other according to the formula

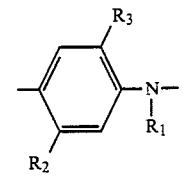

in which, preferably, $R_2$ is $R_{2b}$ and $R_3$ is $R_{3a}$, where $R_{2b}$ and $R_{3a}$ are as defined below.

Any halogen as $R_2$ or $R_3$ is preferably chlorine; any alkyl or alkoxy is preferably methyl or methoxy. Any substituted alkyl group as $R_2$ or $R_3$ is preferably $C_{1-4}$alkyl monosubstituted by $SO_3H$; or a group —$(CH_2)_{1-3}$—$E_{3b}$. Any substituted alkoxy is preferably monosubstituted by $SO_3H$. Any substituted amino or quaternary ammonium group as $R_2$ or $R_3$ is preferably a group $E_{3b}$, more preferably a quaternary ammonium group.

Any substituted alkyl as $R_5$ is preferably a group $-S(CH_2)_{1-3}-E_{3b}$. Accordingly, $R_5$ is, for example, $R_{5x}$, where $R_{5x}$ is $C_{1-4}$-alkyl, $-(CH_2)_t-NR_{23a}R_{24a}$, $-(CH_2)_t-N^{\oplus}R_{25a}R_{26a}R_{27a}$, $C_{1-4}$alkoxy or amino, wherein t is 1, 2 or 3.

$R_5$ is preferably $R_{5a}$, where $R_{5a}$ is methyl, methoxy, $NH_2$ or —$(CH_2)_{1-3}$—$E_{3b}$. More preferably it is $R_{5b}$, where $R_{5b}$ is methyl or $NH_2$. Accordingly, Ring A is preferably substituted by one $R_{2x}$ and one $R_{3x}$, where each of $R_{2x}$ and $R_{3x}$ is independently hydrogen, halo, $C_{1-4}$alkyl, sulpho($C_{1-4}$alkyl), —$(CH_2)_r$—$NR_{23a}R_{24a}$, —$(CH_2)_r$—$N^{\oplus}R_{25a}R_{26a}R_{27a}$, $C_{1-4}$alkoxy, sulpho($C_{1-4}$alkoxy), —NH—CO—$R_{5x}$, —$NR_{23a}R_{24a}$, —$N^{\oplus}R_{25a}R_{26a}R_{27a}$ or sulpho, with the proviso that $R_{2x}$ is other than sulpho.

$R_2$ is preferably $R_{2a}$, where $R_{2a}$ is hydrogen, chlorine, methyl, methoxy, —$NHCOR_{5a}$, —$(CH_2)_{1-3}$—$SO_3H$, —$O(CH_2)_3$—$sO_3H$ or —$(CH_2)_{1-3}$—$E_{3b}$. More preferably it is $R_{2b}$, where $R_{2b}$ is hydrogen, methyl, methoxy, —$NHCOCH_3$ or —$NHCONH_2$; most preferably it is $R_{2c}$, where $R_{2c}$ is hydrogen or methyl.

$R_3$ is preferably $R_{3a}$, where $R_{3a}$ is hydrogen, methyl or methoxy.

Ring B is preferably substituted by one $R_{4x}$, where $R_{4x}$ is hydrogen, $C_{1-4}$alkyl, $C_{1-4}$alkoxy, halo, nitro or sulpho.

$R_4$ is preferably $R_{4a}$, where $R_{4a}$ is hydrogen, $C_{1-2}$alkyl or $C_{1-2}$alkoxy; especially $R_4$ is hydrogen.

Preferably, the azo group bound to the ring B is in meta- or para-position with respect to the carbon atom linked to X; more preferably it is in the para-position.

Representative compounds of formula I are those of formula Ix

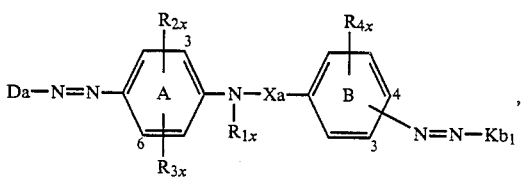

and salts thereof, wherein $Kb_1$ is a group of formula ($e_1$) or ($f_1$), and any Y in Xa is $Y_x$, with the provisos that each compound contains 1, 2, 3 or 4 sulpho groups, and the number of sulpho groups equals or exceeds the total number of basic and cationic groups, and mixtures of such compounds each of which is in free acid or salt form.

Preferred compounds and salts of formula Ix are those (i) wherein the $Kb_1$—N=N— group is in the 3- or 4-position of Ring B,
(ii) wherein $R_{1x}$—$R_{3x}$ are $R_{1a}$—$R_{3a}$, respectively, and $Y_x$ is $Y_a$,
(iii) of (ii) wherein $R_{2x}$ is in the 6-position of Ring A, and $R_{3x}$ is in the 3-position of Ring A,
(iv) of (ii) wherein $R_{2x}$ is $R_{2b}$,
(v) of (iv) wherein the $Kb_1$—N=N— group is in the 3- or 4-position of Ring B,
(vi) of (v) wherein $Kb_1$ is a group of formula ($e_1$),
(vii) of (v) wherein $Kb_1$ is a group of formula ($f_1$), and
(viii) of (i) wherein Xa is Xb.

More preferred compounds and salts of formula Ix are those of formula Ixa

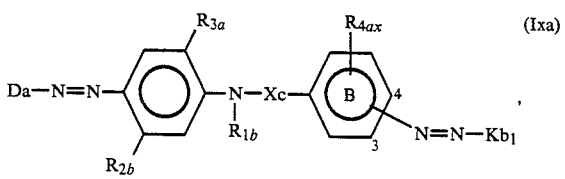

wherein $R_{4ax}$ is as defined below, and the $Kb_1$—N=N— group is in the 3- or 4-position of Ring B.

Preferred compounds and salts of formula Ixa are those (i) wherein Xc is Xd,
(ii) wherein Da is Db,
(iii) wherein $R_{1b}$ is hydrogen,
(iv) wherein $R_{4ax}$ is hydrogen,
(v) wherein Xc is —CO—,
(vi) wherein the $Kb_1$—N=N— group is in the 4-position of Ring B,
(vii) of (vi) wherein $R_{1b}$ is hydrogen, $R_{4ax}$ is hydrogen, and Xc is —CO—, and
(viii) of (vii) wherein $Kb_1$ is a group of formula ($e_2$).

Preferred compounds of formula I include those wherein (1) D is Da, and X is Xb, and
(2) D is Dc, K is Ka, and X is Xd.

Preferred compounds correspond to formula Ia,

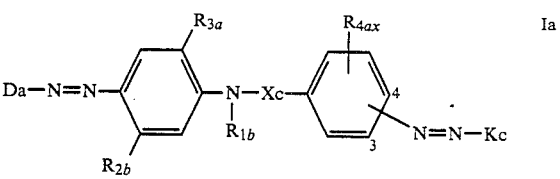

any $R_1$ is $R_{1x}$ and any Y in which the azo group is bound to the 3- or 4-position and $R_{4ax}$ is hydrogen, $C_{1-2}$alkyl, $C_{1-2}$alkoxy or $SO_3H$.

More preferably, in a compound of formula Ia (1) Da is Db;
(2) $R_{1b}$ is hydrogen;
(3) $R_{4ax}$ is hydrogen;
(4) Xb is Xd;
(5) the azo group is bound to the 4-position.

More preferred compounds correspond to formula Ib,

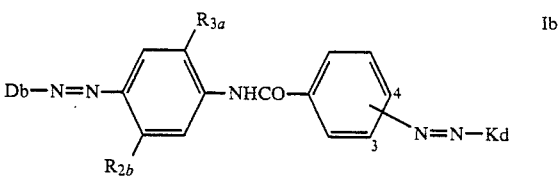

in which the azo group is bound to the 3- or 4-position.

Even more preferred are compounds of formula Ib, in which (1) Db is Dc;
(2) Db is Dd;
(3) Kd is Ke;
(4) those of (1) to (3) in which the azo group is bound to the 4-position;
(5) those of (4) in which $R_{2b}$ is $R_{2c}$;
(6) those of (1) to (5) in which Kd is Kf.

A compound of formula I according to the invention is preferably in free acid form, in alkali metal or unsubstituted or substituted ammonium salt form or in mixed salt form, or may form an internal salt. Any substituted ammonium cation may be derived from a primary, secondary or tertiary amine. For example, the following amines are suitable:- mono-, di- or tri-methyl-, -ethyl-, -propyl- or -butyl-amine; mono-, di- or tri-ethanol-, -propanol- or -isopropanol-amine; N-methyl-N-hydroxyethylamine, N-methyl-N,N-di(hydroxyethyl)amine, N-ethyl-N-hydroxyethoxyethylamine, morpholine, piperidine, piperazine, hydroxyethylmorpholine, hydroxyethylpiperazine, aminoethylpiperazine; ethylenediamine, hexamethylenediamine; dimethylaminopropylamine, diethylaminopropylamine, diethylene glycol amine, diglycol amine and 3-methoxypropylamine.

Also suitable as amines are polyglycol amines. They can be prepared, for example, by reacting ammonia, alkyl- or hydroxyalkylamine with alkylene oxides.

Any substituted ammonium ion may also be a quaternary ammonium ion derived from ammonium compounds which preferably contain one or two quaternary ammonium ions. Examples are tetramethyl-, tetraethyl-, trimethylethyl-, dimethyl-di(2-hydroxypropyl)-, trimethylhydroxyethyl, tetrahydroxyethyl- and trimethylbenzylammonium hydroxide.

The compounds of formula I and mixtures thereof may be prepared by reacting the diazonium salt of one or more aminoazo compounds of formula II

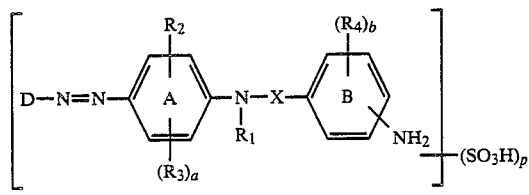

with a compound of formula III

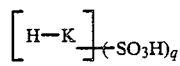

or a mixture of compounds of formula III, in which the symbols are as defined above and p is 1, 2, 3 or 4, q is 0, 1, 2 or 3 and p+q is 1, 2, 3 or 4.

The starting compounds of formula II are either known or may be prepared in accordance with known methods from known starting compounds.

Similarly, the coupling components of formula III are either known or may be prepared in accordance with known methods using known starting materials. For example, coupling components of the pyridone series corresponding to formula IIIa

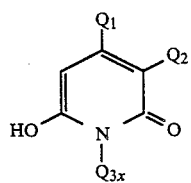

in which $Q_{3x}$ is —$C_{1-6}$alkylene-$E_2$ or the group

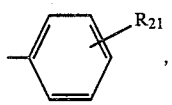

may be prepared by reacting a compound of formula IIIb,

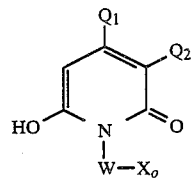

in which W is $C_{1-6}$alkylene or a group

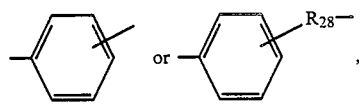

$R_{28}$ is —$NHCOR_{16}$—, —$SO_2NHR_{16}$— or —$CONHR_{16}$—, and $X_o$ is a functional group, preferably a group capable of being split off as an anion, with an amino compound $E_2$—H.

Diazotisation and coupling reacitons may be effected in accordance with known methods.

Diazotisation conveniently is carried out in a medium containing a mineral acid, preferably hydrochloric acid, at 0°–20° C. Coupling conveniently is carried out at pH 3–10, preferably 4–8.

The resulting compound of formula I may be used in the form of the solution as obtained; however, this solution may also be converted into a solid by spray-drying. Furthermore, the conventional method of isolation used for dyestuffs, salting out of the solution, filtering off and drying, is also suitable.

The type of cations present in a compound of formula I may be influenced in different ways depending on the preparation process. One possibility consists in filtering off the diazonium salt which is obtained in the above process, and washing it with water. The solid diazonium compound is then added to an aqueous slurry or solution of the coupling component, which contains a basic salt, lithium-, sodium-, potassium-, ammoniumhydroxide, one or more organic amines or a quaternary ammonium compound. Another method consists in converting the compound of formula I, which is obtained by diazotisation and coupling and is isolated in sodium salt form, into the free acid by using a mineral acid, preferably hydrochloric acid, then filtering and washing with water; the compound is subsequently neutralised and thus converted into the desired alkali metal salt or ammonium salt. Any type of mixed salt form may be obtained by effecting partial conversion into the free acid and/or by step-wise neutralisation.

The salt-changing method, conversion of one salt form into another, can also be used.

If diazotisation takes place using alkyl nitrites, dinitrogen trioxide or mixtures of nitric oxide and oxygen instead of alkali metal nitrite, it is possible to produce solutions of the end products which are free from metal ions. If desired, corresponding salts may be obtained by adding a base which yields cations or by adding an amine.

The compounds according to the invention in form of their water-soluble salts are useful for dyeing or printing hydroxy group- or nitrogen-containing organic substrates. For example, they are suitable for dyeing or printing fibres, threads or textiles produced therefrom, which consist of or contain cellulose materials, such as cotton, in accordance with known methods; cotton is preferably dyed by the exhaust method, for example from a long or short liquor, at room temperature to boiling temperatures. Printing is effected by means of impregnation with a printing paste which is prepared by known methods.

The new dyestuffs can also be used for dyeing or printing leather, preferably chrometanned types of leather, as well as glass or glass products consisting of variable chemical components in accordance with known methods. Furthermore, the dyestuffs are suitable for the preparation of inks in accordance with conventional methods.

The compounds of formula I are especially suited for dyeing or printing paper in accordance with known methods, e.g. for the preparation of sized or unsized paper dyed in the stock. They may also be used for dyeing paper by the dipping process.

The dyeings and prints obtained (especially those on paper) have good fastness to usage.

The compounds of formula I may be used as such or may also be used in the form of dyeing preparations, which are preferably used for dyeing paper. Suitable liquid, preferably aqueous, concentrated dyeing preparations may be made in accordance with known methods, advantageously by dissolving in suitable solvents, optionally adding an adjuvant, e.g. a hydrotropic compound or a stabiliser. The possibility of producing such stable, aqueous concentrated preparations in the course of dyestuff synthesis without intermediate isolation of the dyestuff is particularly advantageous. In this process, coupling takes place for example in the presence of appropriate amines and in particular in the presence of quaternary ammonium hydroxides which serve to introduce corresponding cations as defined above, and optionally in the presence of further hydrotropic adjuvants.

Suitable hydrotropic adjuvants are for example low molecular weight amides, lactones, alcohols, glycols or polyols, low molecular weight ethers or hydroxyalkylation products, as well as nitriles or esters; among these the following compounds are preferably used: - Methanol, ethanol, propanol; ethylene-, propylene-, diethylene-, thiodiethylene- and dipropylene-glycol; butanediol; β-hydroxypropionitrile, pentamethylene glycol, ethylene glycol monoethyl- and -propylether, ethylene diglycol monoethylether, triethylene glycol monobutylether, butyl polyglycol, formamide, dimethylformamide, pyrrolidone, N-methylpyrrolidone, glycol acetate, butyrolactone, urea and ε-caprolactam.

Hydrotropic compounds are described e.g. by H. Rath and S. Müller, in Melliand Textilberichte 40, 787 (1959) or by E. H. Daruwalla in K. Venkataraman, The Chemistry of synthetic Dyes, Vol. VIII, pages 86–92 (1974).

The additional content of a hydrotropic compound further improves the stability on storage of the dyestuff preparation, and the solubility of the dyestuff employed.

An example of a suitable liquid dye preparation is (all parts are by weight):
100 parts of a compound of formula I in water-soluble salt form,
1–100, preferably 1–10, parts of an inorganic salt,
100–800 parts of water,
0–500 parts of one of the hydrotropic compounds mentioned above.

Depending on the salt form used, the liquid dye preparation may be a suspension but is preferably a true solution. The preparations are stable and can be stored for a long period of time.

Similarly, the compounds of formula I may be made into solid, preferably granulated dyeing preparations in accordance with known methods, advantageously by granulating as described in French Patent Specification No. 1.581.900.

A suitable granulate preparation comprises (all parts are by weight):
100 parts of a compound of formula I in water-soluble salt form,
1–100, preferably 1–10, parts of an inorganic salt,
0–800 parts of a standardising agent (preferably non-ionic, such as starch, dextrin, sugar, glucose and urea).

The solid preparation may contain up to 10% residual moisture.

Depending on the cation or cation mixture present, the dyestuffs of formula I possess good solubility properties, particularly good solubility in cold water. Furthermore, when used in paper-making, they colour the waste water only to a slight extent or not at all. They do not mottle on paper and are substantially insensitive to filling material and pH over wide ranges. They are only slightly inclined to give two-sided dyeing on paper. The dyeings on paper have good light fastness properties; after a long-term exposure to light, the shade alters tone-in-tone. The dyed papers also have very good wet fastness properties, they are fast not only to water, but also to milk, fruit juices, sweetened mineral water and tonic water, and in addition they show good alcohol fastness properties.

The dyestuffs have good substantivity, i.e. they exhaust practically quantitatively, and show good built-up; they can be added to the paper pulp directly, i.e. without previously dissolving, as a dry powder or granulate, without reducing the brilliance or the yield of colour. It is advantageous to use the genuine solutions of the dyestuffs as given above, which are stable, of low viscosity and thus capable of being accurately measured out. Fibre materials which contain mechanical wood pulp are dyed in good, even quality with the dyestuffs of the present invention. The dyed paper is both oxidatively and reductively bleachable, which is important for the recycling of waste paper.

The following examples further serve to illustrate the invention. In the examples, all parts and percentages are by weight or volume unless otherwise stated, and the temperatures are in degrees centigrade.

EXAMPLE 1

40.7 Parts of the aminoazo dyestuff prepared by the weakly acid coupling of diazotised 2-aminonaphthalene-6,8-disulphonic acid with aniline-ω-methanesulphonic acid and subsequent saponification in an alkaline medium, are stirred into 500 parts of water. The pH is adjusted to 6.5 by the addition of a small amount of acetic acid. The mixture is heated to 50°, then 20 parts of 4-nitrobenzoyl chloride dissolved in 200 parts of acetone are added dropwise. Simultaneously, sodium carbonate is added to keep the pH at 6–7. Stirring is effected for a further three hours, then the pH of the reaction mixture is adjusted to 9 by the addition of sodium hydroxide solution. The dyestuff intermediate which precipitates is filtered.

The resulting presscake is stirred into 500 parts of water. A pale yellow suspension is formed to which 40 parts of crystalline sodium sulphide are added. After stirring for two hours the reduction is completed, and a brownish suspension is obtained. By heating to 90° a solution is formed to which 50 parts of sodium chloride are added. The mixture is cooled to room temperature whilst stirring. The dyestuff which precipitates is filtered, washed with brine and dried. The aminoazo compound corresponding to the formula

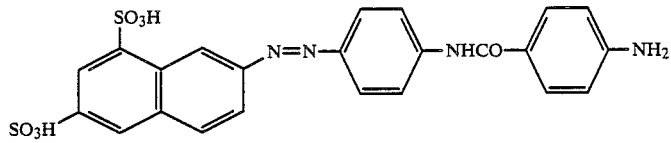

is obtained.

10.5 Parts of this compound are dissolved in 100 parts of water, and 1.5 parts of sodium nitrite are added. This mixture is poured into a preparation of 200 parts of ice and 10 parts of 30% hydrochloric acid. A dark viscous diazo suspension is obtained which is stirred for three hours at 0°–5°. Any excess nitrous acid is decomposed by adding one part of sulphamic acid. Subsequently, 3 parts of 4-methyl-6-hydroxypyridone-(2) are added to the diazo suspension. The pH is elevated to 7–8 by adding 30% sodium hydroxide solution, whereby coupling commences. After about two hours coupling is completed. The precipitated product is filtered, washed with brine and dried. The dyestuff corresponding to the formula

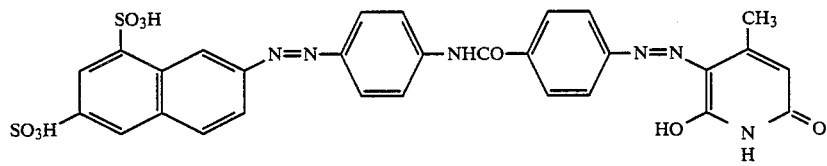

is obtained which dyes paper a neutral-yellow shade. The resulting paper dyeings have notably good wet and light fastness properties.

EXAMPLE 2

43.7 Parts of the aminoazo dyestuff prepared by weakly acid coupling of diazotised 2-aminonaphthalene-6,8-disulphonic acid (30.5 parts) with 22 parts of o-anisidine-ω-methanesulphonic acid and subsequent saponification in an alkaline medium, are stirred into 400 parts water of 80°. Within two hours 24 parts of 4-nitrobenzoyl chloride are added in small portions. Simultaneously, the pH is kept at 6–7 by the dropwise addition of sodium hydroxide solution. When the last portion of 4-nitrobenzoyl chloride has been added, stirring is effected for a further three hours. The dyestuff intermediate which precipitates almost quantitatively is filtered and thoroughly washed with brine.

The resulting presscake is stirred into 400 parts of water and heated to 50°. Then 35 parts of crystalline sodium sulphide are added portionwise. Due to the exothermic evolution of heat the temperature of the reaction mixture increases to 65°. By adding 75 parts of sodium chloride the dyestuff precipitates completely. It is filtered with suction, thoroughly washed with brine and dried. The aminoazo compound corresponding to the formula

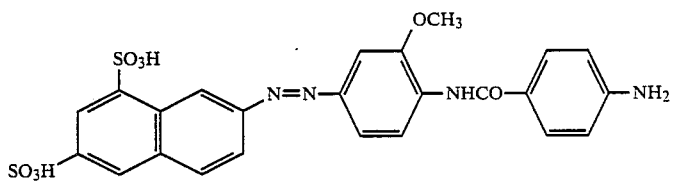

is obtained.

55.6 Parts of this compound are dissolved in 800 parts of water, and 27 parts of a 4N sodium nitrite solution are added. This mixture is dropped into a preparation consisting of 200 parts of ice, 50 parts of 30% hydrochloric acid and 150 parts of sodium chloride. A dark diazo suspension is obtained which is stirred for a further one hour. Any excess nitrous acid is decomposed by adding one part of sulphamic acid. Subsequently, 16 parts of 2-cyanimino-4,6-dihydroxypyrimidine are added to the diazo suspension. The pH is elevated to 7–8 by adding 30% sodium hydroxide solution. After about two hours coupling is completed. The precipitated product is filtered, washed with brine and dried. The dyestuff corresponding to the formula

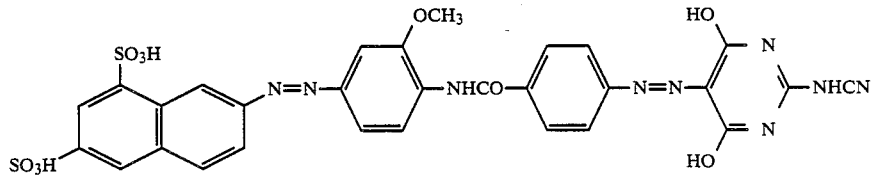

is obtained showing a high colouring strength. It dyes paper a brilliant neutral-yellow shade. The resulting paper dyeings have notably good wet and light fastness properties.

EXAMPLE 3

When according to the method described in Example 2, 19 parts of aniline-ω-methanesulphonic acid are used instead of 22 parts of o-anisidine-ω-methanesulphonic acid the dyestuff corresponding to the formula

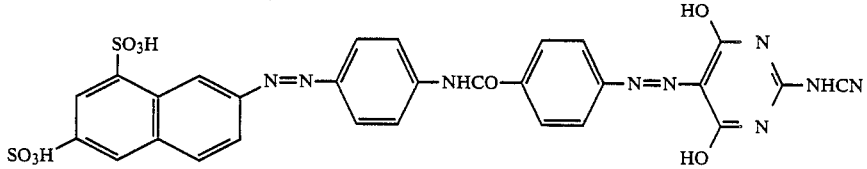

is obtained which dyes paper a brilliant greenish-yellow shade. The dyeings show good light and wet fastness properties.

EXAMPLES 4 TO 112/Table 1

By a method analogous to that of any one of Examples 1 to 3 further compounds of formula I may be prepared using appropriate starting compounds. They correspond to formula (A),

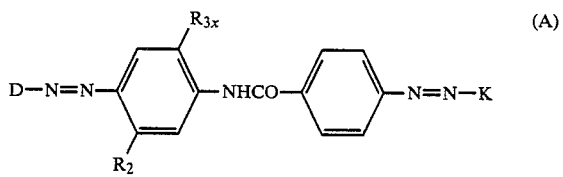

in which the symbols are defined in Table 1 below. These dyestuffs dye paper a greenish-yellow to reddish-yellow shade; the thus obtained dyeings show good light and wet fastness properties.

In particular, the shade on paper obtained with the dyestuffs of Table 1 is as follows:

(a) reddish-yellow: for Examples 7, 9, 11, 20, 26, 33, 42–47, 50–60, 63–66, 73, 75, 100, 105 and 107;

(b) golden-yellow: for Examples 6, 17, 19, 30, 34, 35, 41, 49, 69, 71, 80, 84, 91, 96 and 104;

(c) neutral-yellow: for Examples 4, 5, 8, 10, 12–16, 18, 21–25, 27–29, 31, 32, 36–40, 48, 61, 62, 67, 68, 70, 72, 74, 76–79, 81–83, 85–90, 92–95, 97–99, 101, 102, 106, 108, 109 and 112;

(d) greenish-yellow: for Examples 103, 110 and 111.

The positive charge of each cationic group present in a compound listed in the following Tables 1, 3 and 4 is balanced by the negative charge of an $SO_3^{\ominus}$ ion or by $An^{\ominus}$, where $An^{\ominus}$ is a non-chromophoric anion, e.g., an anion of the reaction medium, preferably a chloride, acetate or hydroxide ion. Each protonatable amino group present forms an internal salt with a sulpho group. Where no cationic or protonatable amino group is present or where the total number of anionic groups are greater than the total number of cationic or basic groups, the anionic group(s) is (are) in external salt form, especially in the sodium salt form.

TABLE 1

| | Compounds of formula (A) | | | |
|---|---|---|---|---|
| Ex. No. | D | $R_2$ | $R_{3x}$ | K |
| 4 | 1,5-naphthalene-disulphonic (SO₃H at 1 and 5, linked at position shown) | H | H | 4-CH₃, 6-HO, N–H, 2-oxo pyridone |
| 5 | 1,5-naphthalene-disulphonic | CH₃ | H | 4-CH₃, 6-HO, N–H, 2-oxo pyridone |
| 6 | 1,5-naphthalene-disulphonic | H | OCH₃ | 4-CH₃, 6-HO, N–H, 2-oxo pyridone |

TABLE 1-continued

Compounds of formula (A)

| Ex. No. | D | R₂ | R₃ₓ | K |
|---|---|---|---|---|
| 7 | 1,5-naphthalenedisulfonic acid (SO₃H at 1 and 5 positions) | CH₃ | OCH₃ | 4-CH₃-3-methyl-6-hydroxy-2-pyridone |
| 8 | 1,5-naphthalenedisulfonic acid | CH₃ | CH₃ | 4-CH₃-3-methyl-6-hydroxy-2-pyridone |
| 9 | 1,5-naphthalenedisulfonic acid | OCH₃ | OCH₃ | 4-CH₃-3-methyl-6-hydroxy-2-pyridone |
| 10 | 1,5-naphthalenedisulfonic acid | NHCOCH₃ | H | 4-CH₃-3-methyl-6-hydroxy-2-pyridone |
| 11 | 1,5-naphthalenedisulfonic acid | NHCOCH₃ | OCH₃ | 4-CH₃-3-methyl-6-hydroxy-2-pyridone |
| 12 | 1,5-naphthalenedisulfonic acid | NHCONH₂ | H | 4-CH₃-3-methyl-6-hydroxy-2-pyridone |
| 13 | 1,5-naphthalenedisulfonic acid | Cl | H | 4-CH₃-3-methyl-6-hydroxy-2-pyridone |
| 14 | naphthalenesulfonic acid | H | SO₃H | 4-CH₃-3-methyl-6-hydroxy-2-pyridone |

TABLE 1-continued

Compounds of formula (A)

| Ex. No. | D | R₂ | R₃ₓ | K |
|---|---|---|---|---|
| 15 | 3,5-disulfonaphth-7-yl (HO₃S at 3, SO₃H at 5, methyl at 7) | H | H | 4-methyl-3-methyl-6-hydroxy-2-pyridone |
| 16 | 3,5-disulfonaphth-7-yl | CH₃ | H | 4-methyl-3-methyl-6-hydroxy-2-pyridone |
| 17 | 3,5-disulfonaphth-7-yl | H | OCH₃ | 4-methyl-3-methyl-6-hydroxy-2-pyridone |
| 18 | 1,6-disulfonaphth-7-yl (SO₃H at 1 and 6) | CH₃ | H | 4-methyl-3-methyl-6-hydroxy-2-pyridone |
| 19 | 1,6-disulfonaphth-7-yl | H | OCH₃ | 4-methyl-3-methyl-6-hydroxy-2-pyridone |
| 20 | 1,6-disulfonaphth-7-yl | CH₃ | OCH₃ | 4-methyl-3-methyl-6-hydroxy-2-pyridone |
| 21 | 1,3,6-trisulfonaphth-7-yl | CH₃ | H | 4-methyl-3-methyl-6-hydroxy-2-pyridone |
| 22 | 1,3,6-trisulfonaphth-7-yl | NHCOCH₃ | H | 4-methyl-3-methyl-6-hydroxy-2-pyridone |
| 23 | 1,3,5-trisulfonaphth-7-yl | CH₃ | H | 4-methyl-3-methyl-6-hydroxy-2-pyridone |

TABLE 1-continued

Compounds of formula (A)

| Ex. No. | D | R₂ | R₃ₓ | K |
|---|---|---|---|---|
| 24 | naphthalene with SO₃H (1-position), SO₃H (5-position), SO₃H (7-position), CH₃ substituent | NHCONH₂ | H | 4-CH₃, 3-substituted, 6-HO, 2-oxo pyridinone (NH) |
| 25 | naphthalene with SO₃H (7), SO₃H (4), 1-CH₃ | CH₃ | H | same pyridinone |
| 26 | naphthalene with SO₃H (7), SO₃H (4), 1-CH₃ | CH₃ | OCH₃ | same pyridinone |
| 27 | naphthalene with SO₃H (7), SO₃H (3), 1-CH₃ | CH₃ | H | same pyridinone |
| 28 | naphthalene with SO₃H (1), SO₃H (6), 3-CH₃ | CH₃ | H | same pyridinone |
| 29 | naphthalene with SO₃H (1), SO₃H (6), 3-CH₃ | H | H | same pyridinone |
| 30 | naphthalene with SO₃H (1), SO₃H (6), 3-CH₃ | H | OCH₃ | same pyridinone |
| 31 | benzene with SO₃H, SO₃H (disulfonated) | H | H | same pyridinone |
| 32 | benzene with SO₃H, SO₃H (disulfonated) | CH₃ | H | same pyridinone |

TABLE 1-continued

| Ex. No. | D | R$_2$ | R$_{3x}$ | K |
|---|---|---|---|---|
| 33 | 2,4-disulfophenyl (SO$_3$H at 2 and 4) | CH$_3$ | OCH$_3$ | 4,5-dimethyl-6-hydroxy-2-oxo-1,2-dihydropyridin-3-yl |
| 34 | 2,4-disulfophenyl | H | OCH$_3$ | 4,5-dimethyl-6-hydroxy-2-oxo-1,2-dihydropyridin-3-yl |
| 35 | 2,5-disulfophenyl | H | OCH$_3$ | 4,5-dimethyl-6-hydroxy-2-oxo-1,2-dihydropyridin-3-yl |
| 36 | 2,5-disulfophenyl | CH$_3$ | H | 4,5-dimethyl-6-hydroxy-2-oxo-1,2-dihydropyridin-3-yl |
| 37 | 4-methyl-2,5-disulfophenyl | H | H | 4,5-dimethyl-6-hydroxy-2-oxo-1,2-dihydropyridin-3-yl |
| 38 | 4-methyl-2,5-disulfophenyl | CH$_3$ | H | 4,5-dimethyl-6-hydroxy-2-oxo-1,2-dihydropyridin-3-yl |
| 39 | 1,5-disulfonaphth-3-yl | H | H | 3-carbamoyl-4,5-dimethyl-6-hydroxy-2-oxo-1,2-dihydropyridin-3-yl |
| 40 | 1,5-disulfonaphth-3-yl | CH$_3$ | H | 3-carbamoyl-4,5-dimethyl-6-hydroxy-2-oxo-1,2-dihydropyridin-3-yl |
| 41 | 1,5-disulfonaphth-3-yl | H | OCH$_3$ | 3-carbamoyl-4,5-dimethyl-6-hydroxy-2-oxo-1,2-dihydropyridin-3-yl |

TABLE 1-continued

| Ex. No. | Compounds of formula (A) D | R₂ | R₃ₓ | K |
|---|---|---|---|---|
| 42 | 1,5-naphthalenedisulfonic acid (SO₃H at 1 and 5 positions) | H | H | 4-methyl-3-cyano-6-hydroxy-2-pyridone |
| 43 | 1,5-naphthalenedisulfonic acid | CH₃ | H | 4-methyl-3-cyano-6-hydroxy-2-pyridone |
| 44 | 1,5-naphthalenedisulfonic acid | CH₃ | OCH₃ | 4-methyl-3-cyano-6-hydroxy-2-pyridone |
| 45 | 1,5-naphthalenedisulfonic acid | H | OCH₃ | 4-methyl-3-cyano-6-hydroxy-2-pyridone |
| 46 | 1,5-naphthalenedisulfonic acid | CH₃ | CH₃ | 4-methyl-3-cyano-6-hydroxy-2-pyridone |
| 47 | 1,5-naphthalenedisulfonic acid | NHCOCH₃ | H | 4-methyl-3-cyano-6-hydroxy-2-pyridone |
| 48 | 1,5-naphthalenedisulfonic acid | H | H | 4-methyl-6-hydroxy-N-ethyl-2-pyridone |
| 49 | 1,5-naphthalenedisulfonic acid | H | OCH₃ | 4-methyl-6-hydroxy-N-ethyl-2-pyridone |

TABLE 1-continued
Compounds of formula (A)
| Ex. No. | D | $R_2$ | $R_{3x}$ | K |
|---|---|---|---|---|
| 50 | 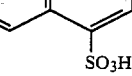 | H | H | 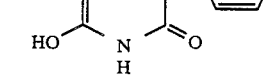 |
| 51 | 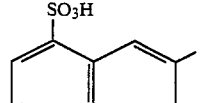 | H | $OCH_3$ | 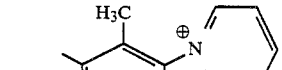 |
| 52 | 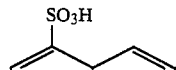 | $CH_3$ | $OCH_3$ | 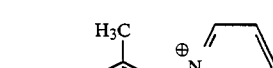 |
| 53 | 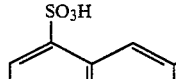 | $CH_3$ | H | 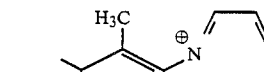 |
| 54 | 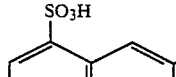 | H | H | 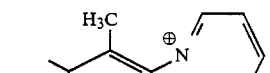 |
| 55 | 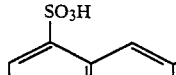 | $CH_3$ | H | 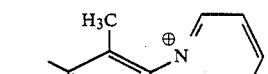 |
| 56 | 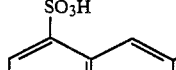 | $CH_3$ | $OCH_3$ | 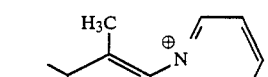 |
| 57 | 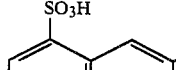 | H | $OCH_3$ | 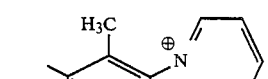 |

TABLE 1-continued

Compounds of formula (A)

| Ex. No. | D | $R_2$ | $R_{3x}$ | K |
|---|---|---|---|---|
| 58 | 2,5-disulfophenyl | H | H | 4,5-dimethyl-6-hydroxy-3-(3-methylpyridinio)-pyridin-2(1H)-one |
| 59 | 2,5-disulfophenyl | $CH_3$ | $OCH_3$ | 4,5-dimethyl-6-hydroxy-3-(3-methylpyridinio)-pyridin-2(1H)-one |
| 60 | 2,5-disulfophenyl | $NHCOCH_3$ | H | 4,5-dimethyl-6-hydroxy-3-(3-methylpyridinio)-pyridin-2(1H)-one |
| 61 | 6,8-disulfo-2-naphthyl | H | H | 4,5-dimethyl-3-(dimethylaminomethyl)-6-hydroxy-1-ethylpyridin-2(1H)-one |
| 62 | 6,8-disulfo-2-naphthyl | $CH_3$ | H | 4,5-dimethyl-3-(dimethylaminomethyl)-6-hydroxy-1-ethylpyridin-2(1H)-one |
| 63 | 6,8-disulfo-2-naphthyl | H | H | 3-cyano-4-(sulfomethyl)-5-methyl-6-hydroxypyridin-2(1H)-one |
| 64 | 6,8-disulfo-2-naphthyl | H | $OCH_3$ | 3-cyano-4-(sulfomethyl)-5-methyl-6-hydroxypyridin-2(1H)-one |
| 65 | 6,8-disulfo-2-naphthyl | H | H | 3-cyano-4-(sulfomethyl)-5-methyl-6-hydroxy-1-ethylpyridin-2(1H)-one |

TABLE 1-continued
Compounds of formula (A)
| Ex. No. | D | $R_2$ | $R_{3x}$ | K |
|---|---|---|---|---|
| 66 | 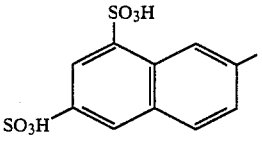 | H | $OCH_3$ | 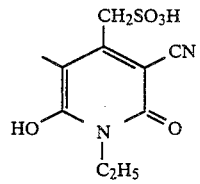 |
| 67 | 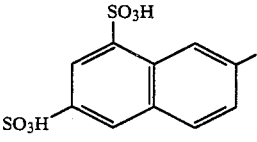 | H | H | 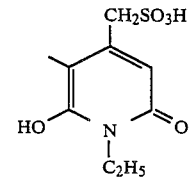 |
| 68 | 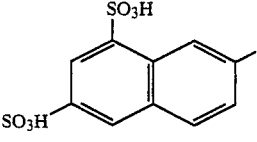 | $CH_3$ | H | 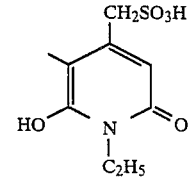 |
| 69 | 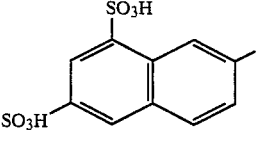 | H | $OCH_3$ | 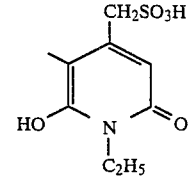 |
| 70 | 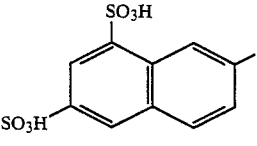 | H | H | 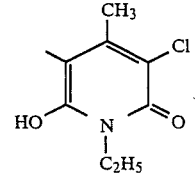 |
| 71 | 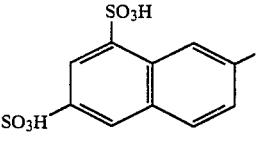 | H | $OCH_3$ | 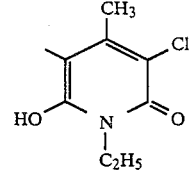 |
| 72 | 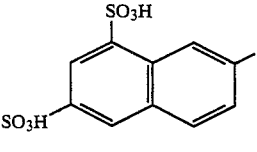 | H | H | 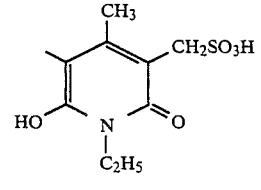 |
| 73 | 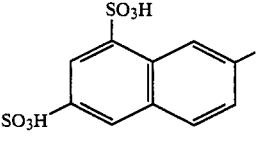 | $CH_3$ | $OCH_3$ | 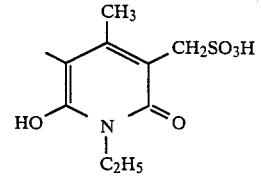 |

TABLE 1-continued

Compounds of formula (A)

| Ex. No. | D | $R_2$ | $R_{3x}$ | K |
|---|---|---|---|---|
| 74 | 7-methylnaphthalene-1,3-disulfonic acid (SO₃H at 1 and 3, methyl at 7) | $CH_3$ | H | 1-methyl-4-methyl-5-?-6-hydroxy-2-oxo-1,2-dihydropyridine with $CH_2SO_3H$ at 3 |
| 75 | naphthalene-1,6-disulfonic acid (HO₃S at 1, SO₃H at 6, methyl at 8) | H | H | 4-amino-5-methyl-6-hydroxy-1-ethyl-2-oxo-1,2-dihydropyridine-3-carbonitrile |
| 76 | naphthalene-1,5-disulfonic acid (SO₃H at 1 and 5, methyl at 7) | H | H | 4-methyl-6-hydroxy-1-(2-sulfoethyl)-2-oxo-1,2-dihydropyridine-3-carboxamide |
| 77 | naphthalene-1,5-disulfonic acid (SO₃H at 1 and 5, methyl at 7) | $CH_3$ | H | 4-methyl-6-hydroxy-1-(2-sulfoethyl)-2-oxo-1,2-dihydropyridine-3-carboxamide |
| 78 | naphthalene-1,5-disulfonic acid (SO₃H at 1 and 5, methyl at 7) | H | H | ethyl 4-amino-5-methyl-6-hydroxy-2-oxo-1,2-dihydropyridine-3-carboxylate |
| 79 | naphthalene-1,5-disulfonic acid (SO₃H at 1 and 5, methyl at 7) | $CH_3$ | H | ethyl 4-amino-5-methyl-6-hydroxy-2-oxo-1,2-dihydropyridine-3-carboxylate |
| 80 | naphthalene-1,5-disulfonic acid (SO₃H at 1 and 5, methyl at 7) | H | $OCH_3$ | ethyl 4-amino-5-methyl-6-hydroxy-2-oxo-1,2-dihydropyridine-3-carboxylate |
| 81 | naphthalene-1,5-disulfonic acid (SO₃H at 1 and 5, methyl at 7) | H | H | ethyl 4-methyl-5-methyl-6-hydroxy-2-oxo-1,2-dihydropyridine-3-carboxylate |

TABLE 1-continued
Compounds of formula (A)
| Ex. No. | D | $R_2$ | $R_{3x}$ | K |
|---|---|---|---|---|
| 82 | 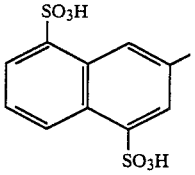 | $CH_3$ | H | 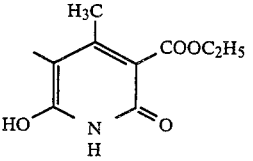 |
| 83 | 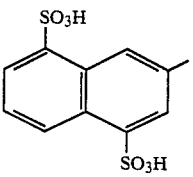 | H | H | 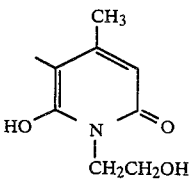 |
| 84 | 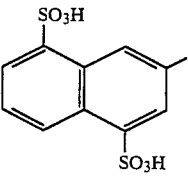 | H | $OCH_3$ | 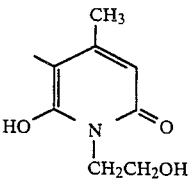 |
| 85 | 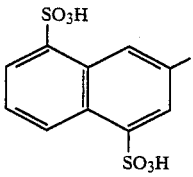 | $CH_3$ | H | 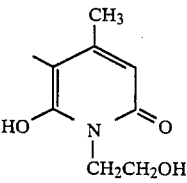 |
| 86 | 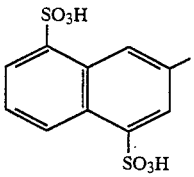 | $NHCOCH_3$ | H | 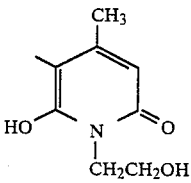 |
| 87 | 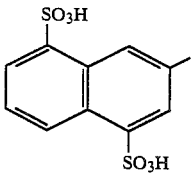 | $CH_3$ | H | 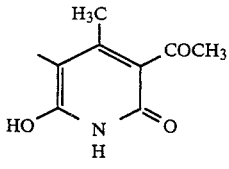 |
| 88 | 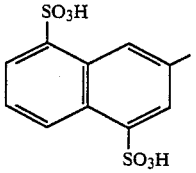 | H | H | 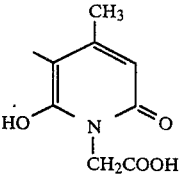 |
| 89 | 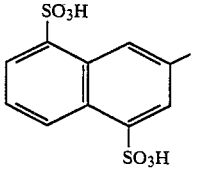 | $CH_3$ | H | 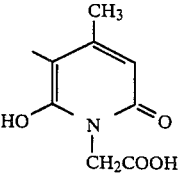 |

TABLE 1-continued

Compounds of formula (A)

| Ex. No. | D | $R_2$ | $R_{3x}$ | K |
|---|---|---|---|---|
| 90 | 1,5-naphthalene-disulfonic acid (SO₃H at 1,5 positions) | H | H | 4-phenyl-5-methyl-6-hydroxy-2-pyridone |
| 91 | 1,5-naphthalene-disulfonic acid | H | OCH₃ | 4-phenyl-5-methyl-6-hydroxy-2-pyridone |
| 92 | 1,5-naphthalene-disulfonic acid | CH₃ | H | 4-phenyl-5-methyl-6-hydroxy-2-pyridone |
| 93 | 1,5-naphthalene-disulfonic acid | NHCOCH₃ | H | 4-phenyl-5-methyl-6-hydroxy-2-pyridone |
| 94 | 1,5-naphthalene-disulfonic acid | H | H | 4,5-dimethyl-6-hydroxy-1-(2-sulfoethyl)-2-pyridone |
| 95 | 1,5-naphthalene-disulfonic acid | CH₃ | H | 4,5-dimethyl-6-hydroxy-1-(2-sulfoethyl)-2-pyridone |
| 96 | 1,5-naphthalene-disulfonic acid | H | OCH₃ | 4,5-dimethyl-6-hydroxy-1-(2-sulfoethyl)-2-pyridone |

TABLE 1-continued

Compounds of formula (A)

| Ex. No. | D | R₂ | R₃ₓ | K |
|---|---|---|---|---|
| 97 | 1,5-naphthalene-disulfonic acid (SO₃H at 1 and 5 positions) | H | H | 3-methyl-4-methyl-6-hydroxy-1-(2-aminoethyl)-2-pyridone |
| 98 | 1,5-naphthalene-disulfonic acid | H | H | 3-methyl-4-methyl-6-hydroxy-1-[3-(dimethylamino)propyl]-2-pyridone |
| 99 | 1,5-naphthalene-disulfonic acid | H | H | 4-carboxy-3-methyl-6-hydroxy-2-pyridone |
| 100 | 1,5-naphthalene-disulfonic acid | H | OCH₃ | 4-amino-3-cyano-5-methyl-6-hydroxy-2-pyridone |
| 101 | 1,5-naphthalene-disulfonic acid | H | H | 6-amino-5-methyl-2,4-dioxo-1,2,3,4-tetrahydropyrimidine |
| 102 | 1,5-naphthalene-disulfonic acid | H | H | 6-amino-5-methyl-2-imino-4-oxo-pyrimidine |
| 103 | 1,5-naphthalene-disulfonic acid | H | H | 6-hydroxy-5-methyl-2,4-dioxo-1,2,3,4-tetrahydropyrimidine |
| 104 | 1,5-naphthalene-disulfonic acid | H | OCH₃ | 6-hydroxy-5-methyl-2,4-dioxo-1,2,3,4-tetrahydropyrimidine |

TABLE 1-continued

| Ex. No. | D | R$_2$ | R$_{3x}$ | K |
|---|---|---|---|---|
| 105 | 3-methyl-naphthalene-1,5-disulfonic acid (SO$_3$H at 1,5; CH$_3$ at 7) | CH$_3$ | H | barbituric acid residue (HO–C=C–C(=O)–NH–C(=O)–NH–, =O) |
| 106 | 4-methylbenzene-1,3-disulfonic acid | H | H | barbituric acid residue |
| 107 | 4-methylbenzene-1,3-disulfonic acid | CH$_3$ | OCH$_3$ | barbituric acid residue |
| 108 | 4-methylbenzene-1,3-disulfonic acid | NHCOCH$_3$ | H | 5-cyanoimino-barbituric acid residue (=NCN) |
| 109 | 3-methylnaphthalene-1,5-disulfonic acid | H | OCH$_3$ | 3-methyl-1-phenyl-5-amino-pyrazole-4-yl (CH$_3$, NH$_2$, N–N–Ph) |
| 110 | 3-methylnaphthalene-1,5-disulfonic acid | H | H | 3-methyl-1-phenyl-5-amino-pyrazole-4-yl |
| 111 | 3-methylnaphthalene-1,5-disulfonic acid | H | H | 3-methyl-1-(4-sulfophenyl)-5-amino-pyrazole-4-yl |
| 112 | 3-methylnaphthalene-1,5-disulfonic acid | H | H | 6-amino-5-cyanoimino-barbituric-acid-type residue (H$_2$N, =NCN) |

EXAMPLES 113 TO 128/Table 2

By a method analogous to that of Examples 2 and 3 further compounds of formula I may be prepared using appropriate starting compounds. They correspond to formula (B)

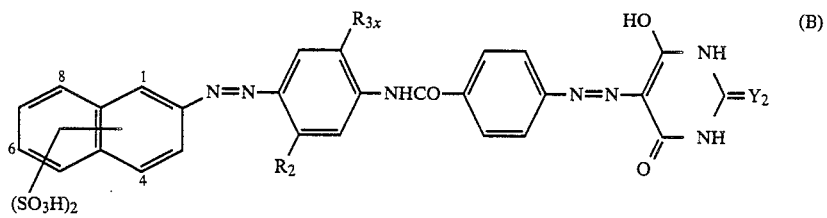

in which the symbols are defined in Table 2 below. In the last column of Table 2 the shade of the paper dyeing obtained with each of the listed dyestuffs is indicated, whereby
 a is greenish-yellow,
 b is neutral-yellow, and
 c is weakly reddish yellow.
These paper dyeings show good light and wet fastness properties.

TABLE 2

| Ex. No. | SO₃H on the naphthyl ring in the positions | R₂ | R₃ₓ | Y₂ | shade on paper |
|---|---|---|---|---|---|
| 113 | 6,8 | CH₃ | H | =NCN | b |
| 114 | " | CH₃ | CH₃ | " | b |
| 115 | " | " | OCH₃ | " | c |
| 116 | " | —NHCOCH₃ | H | " | c |
| 117 | " | —NHCONH₂ | H | " | c |
| 118 | 5,7 | H | H | " | a |
| 119 | " | CH₃ | H | " | b |
| 120 | " | H | OCH₃ | " | b |
| 121 | " | —NHCOCH₃ | H | " | c |
| 122 | 4,8 | H | OCH₃ | " | b |
| 123 | 6,8 | H | H | =NCONH₂ | a |
| 124 | " | H | OCH₃ | " | b |
| 125 | " | CH₃ | H | " | b |
| 126 | 5,7 | H | H | " | a |
| 127 | " | H | OCH₃ | " | b |
| 128 | 4,8 | H | H | " | b |

EXAMPLE 129

20 Parts of 3-nitrobenzoyl chloride are reacted with 42 parts of the aminoazo dyestuff prepared by coupling of diazotised 2-aminonaphthalene-4,8-disulphonic acid with m-toluidine. Subsequently, the resulting product is reduced with sodium sulphide. Diazotisation is effected in accordance with conventional manner and the diazo product is coupled with 2.5 parts of 4-methyl-6-hydroxypyridone-(2). The resulting dyestuff corresponds to the formula

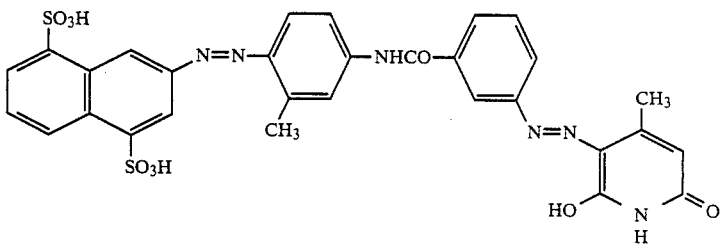

it dyes paper a brilliant neutral-yellow shade. The paper dyeings show good light and wet fastness properties.

EXAMPLES 130 TO 148/Table 3

By a method analogous to that described in Example 129 further compounds of formula I may be prepared which are listed in the following Table 3. They correspond to formula (C)

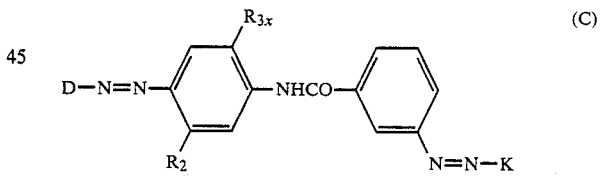

in which the symbols are defined in Table 3 below. These dyestuffs dye paper a greenish-yellow to neutral-yellow shade, the resulting paper dyeings show good general fastness properties.

TABLE 3

| Ex. No. | D | R₂ | R₃ₓ | K |
|---|---|---|---|---|
| 130 | ![SO₃H naphthyl SO₃H] | H | H | ![CH₃ pyridone HO N H O] |
| 131 | " | NHCOCH₃ | H | " |
| 132 | " | H | OCH₃ | " |
| 133 | " | CH₃ | " | " |

TABLE 3-continued

Compounds of formula (C)

| Ex. No. | D | $R_2$ | $R_{3x}$ | K |
|---|---|---|---|---|
| 134 | 3,7-disulfo-2-naphthyl (SO₃H at 3,7) | H | H | " |
| 135 | " | CH₃ | H | " |
| 136 | " | H | OCH₃ | " |
| 137 | 4,6-disulfo-2-methylnaphthyl | H | H | " |
| 138 | " | CH₃ | H | " |
| 139 | " | H | OCH₃ | " |
| 140 | 3,6-disulfo-4-methylnaphthyl | H | " | " |
| 141 | 1,6-disulfo-4-methylnaphthyl | CH₃ | H | " |
| 142 | 2,4-disulfo-methylphenyl | " | H | " |
| 143 | " | " | H | 4,5-dimethyl-3-cyano-6-hydroxy-2-oxo-pyridinyl |
| 144 | 1,4-disulfo-7-methylnaphthyl | " | H | " |
| 145 | 1,4-disulfo-7-methylnaphthyl | CH₃ | H | 5-methyl-6-hydroxy-pyrimidine-2,4-dione |

TABLE 3-continued

| | Compounds of formula (C) | | | |
|---|---|---|---|---|
| Ex. No. | D | $R_2$ | $R_{3x}$ | K |
| 146 | " | H | OCH₃ | (structure: 4-methyl-6-amino-pyridone coupled to benzene-SO₃H) |
| 147 | " | CH₃ | H | (structure: 4-methyl-6-hydroxy-pyridone-(2) with ⊕N-pyridinium) |
| 148 | (7-methylnaphthalene-1,3-disulphonic acid) | " | H | " |

EXAMPLE 149

42 Parts of the aminoazo dyestuff prepared by coupling of diazotised 2-aminonaphthalene-4,8-disulphonic acid with m-toluidine are reacted with 25 parts of acetamidobenzene-4-sulphonyl chloride. Subsequently, alkaline saponification is effected. The thus obtained product is diazotised in accordance with conventional methods and coupled with 2.5 parts of 4-methyl-6-hydroxypyridone-(2). The dyestuff corresponding to the formula

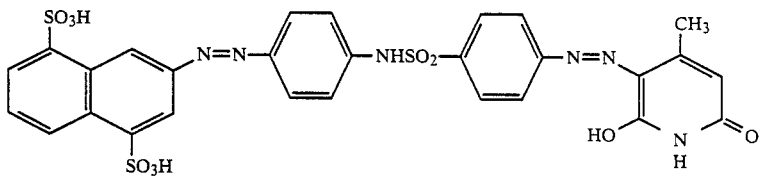

is obtained which dyes paper a neutral-yellow shade. The light and wet fastness properties of these paper dyeings are good.

EXAMPLE 150

When according to the method described in Example 149, 40.7 parts of the aminoazo dyestuff prepared by coupling of diazotised 2-aminonaphthalene-4,8-disulphonic acid with aniline-ω-methanesulphonic acid and subsequent alkaline saponification are used the dyestuff corresponding to the formula

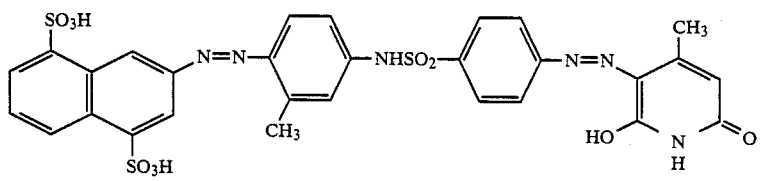

is obtained which dyes paper a neutral-yellow shade resulting in paper dyeings of good light and wet fastness properties.

EXAMPLE 151

40.7 Parts of 2-(4'-aminobenzeneazo)naphthalene-4,8-disulphonic acid are suspended in 400 parts of ice water. To this suspension 18.5 parts of cyanuric chloride are added. Stirring is effected for three hours at 0°-5°, whereby the pH is kept at 5-6 by adding sodium hydroxide solution. After two hours the condensation is completed. Then, 14 parts of 3-nitroaniline are added, and the mixture is slowly heated to 80°, the pH is kept at 6-7. After a further six hours the starting material is no longer detectable. To the resulting dyestuff suspension 40 parts of sodium sulphide are added slowly, whereby the reduction of the nitro group commences. After the reduction is completed, the mixture is cooled to room temperature, whilst stirring. The thus obtained compound corresponding to the formula

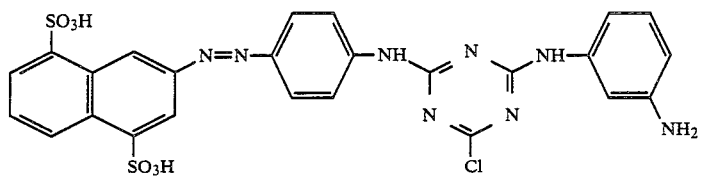

is filtered and stirred into 200 parts of water. To this mixture 20 parts of conc. hydrochloric acid are added followed by 25 parts of a 4N sodium nitrite solution, which are added dropwise. Stirring is effected for three hours. After the addition of 13 parts of 4-methyl-6-hydroxypyridone-(2) the pH is adjusted to 8-9 by adding sodium hydroxide solution. A yellow dyestuff is obtained which is filtered, washed with brine and dried. The dyestuff corresponding to the formula

EXAMPLES 152 TO 160/Table 4

By a method analogous to that described in Example 151 further compounds of formula I may be prepared which are listed in the following Table 4. The chlorine atom bound to the triazine ring may be replaced preferably by an amine such as mono- or di-ethanolamine in accordance with known methods. The compounds correspond to formula (E)

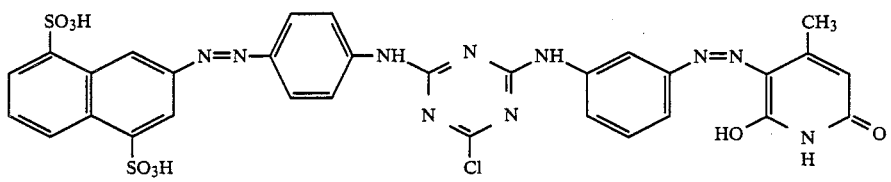

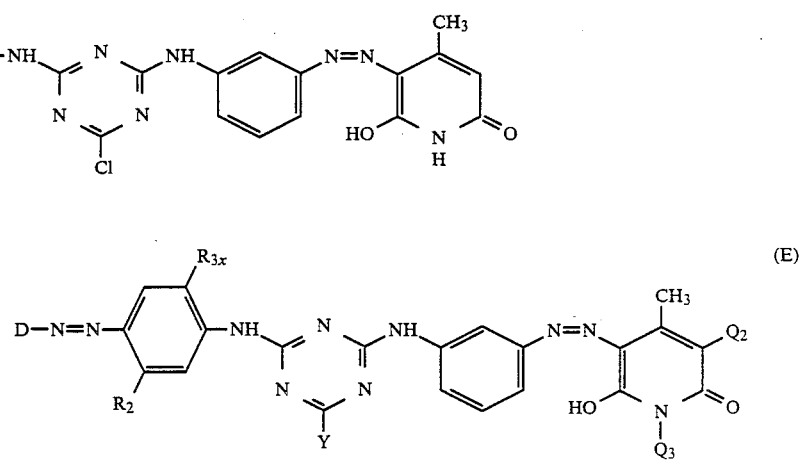

dyes paper a neutral-yellow shade. The resulting paper dyeings have good light and wet fastness properties.

in which the symbols are defined in Table 4 below. These dyestuffs dye paper a neutral-yellow shade, the resulting paper dyeings show good light and wet fastness properties.

TABLE 4

| Ex. No. | D | $R_2$ | $R_3$ | Y | $Q_2$ | $Q_3$ |
|---|---|---|---|---|---|---|
| 152 | ![naphthalene-1,5-disulfonic with 7-methyl] | H | H | Cl | $-\overset{\oplus}{N}$(pyridyl) | H |
| 153 | " | H | H | $-N(CH_2CH_2OH)_2$ | " | H |
| 154 | " | H | $OCH_3$ | " | H | H |
| 155 | " | $CH_3$ | " | $-NHCH_2CH_2OH$ | $CONH_2$ | H |
| 156 | " | H | H | $-NHCH_2CH_2SO_3H$ | H | H |
| 157 | " | $CH_3$ | H | " | H | $C_2H_5$ |
| 158 | ![naphthalene-1,3-disulfonic with 7-methyl] | H | H | Cl | H | " |
| 159 | " | H | H | $-NHCH_2CH_2OH$ | H | " |
| 160 | " | $CH_3$ | H | " | H | H |

In accordance with the reaction and isolation conditions as described the compounds of Examples 1 to 160 are obtained in sodium salt form provided that no internal salt is formed. They may, depending on the reaction and isolation conditions, or by reacting the sodium salts in accordance with known methods also be obtained in free acid form or in other salt forms, for example those salt forms or mixed salt forms containing one or more cations indicated in the description above.

EXAMPLE 161

The dyestuff prepared according to the method given in Example 2 is stirred into 200 parts of water prior to drying, and is mixed with 20 parts of 30% hydrochloric acid. After having been stirred for a longer time, the dyestuff, in free acid form, is filtered off and is added into 15 parts of triethanolamine. The dyestuff dissolves whilst releasing heat. This solution is adjusted to 90 parts by adding water to give a dyestuff solution which is storage-stable and ready for use.

EXAMPLE 162

If in Example 161 lithium hydroxide solution is used instead of triethanolamine, a liquid aqueous dye preparation is obtained which contains the dyestuff according to Example 2 in lithium salt form.

By a method analogous to that described in Example 161 or 162 the dyestuffs of Examples 1 and 3 to 160 may also be converted into liquid aqueous dyeing preparations showing high stability on storage.

In the following examples the application of the compounds of this invention as well as of liquid aqueous dyeing preparations thereof is illustrated.

APPLICATION EXAMPLE A

70 Parts of chemically bleached sulphite cellulose obtained from pinewood and 30 parts of chemically bleached sulphite cellulose obtained from birchwood are ground in a hollander in 2000 parts of water. 0.2 Part of the dyestuff of Example 1 or 2 are sprinkled into this pulp or 1.0 part of the liquid dyestuff preparation according to Example 161 or 162 are added to this pulp. After mixing for 20 minutes, paper is produced from this pulp. The absorbent paper obtained in this way is dyed a neutral-yellow shade. The waste water is practically colourless.

APPLICATION EXAMPLE B 0.5 Part of the dyestuff of Example 1 or 2 are dissolved in 100 parts of hot water and cooled to room temperature. This solution is added to 100 parts of chemically bleached sulphite cellulose which have been ground in a hollander with 2000 parts of water. After thorough mixing for 15 minutes, sizing takes place in the usual way with rosin size and aluminum sulphate. Paper which is produced from this material is of neutral-yellow shade and has good waste water and wet fastness properties.

APPLICATION EXAMPLE C

An absorbent length of unsized paper is drawn at 40°-50° through a dyestuff solution having the following composition:

0.5 part of the dyestuff of Example 1 or 2 or of the liquid dye preparation according to Example 161 or 162,
0.5 part of starch, and
99.0 parts of water.

The excess dyestuff solution is squeezed out through two rollers. The dried length of paper is dyed a neutral-yellow shade.

The dyestuffs or liquid dyestuff preparations of the remaining examples may also be used for dyeing paper according to Application Examples A to C. The resulting paper dyeings are dyed a yellow shade. They have good general fastness properties.

Application Example D (leather)

100 Parts of intermediately dried chrome velours leather are agitated for one hour at 50° in a vessel with a liquor consisting of 400 parts of water, 2 parts of 25% ammonium hydroxide solution and 0.2 part of a conventional wetting agent. Then the liquor is run off. To the agitated still wet chrome velours leather 400 parts of water of 60° and 1 part of 25% ammonium hydroxide solution are added. After the addition of 5 parts of the dyestuff of Example 2 dissolved in 200 parts of water, dyeing is effected during 90 minutes at 60°. Subsequently, 50 parts of 8% formic acid are slowly added to adjust to an acidic pH, and agitating is continued for a further 30 minutes. The leather is then rinsed, dried and prepared in the normal way giving a leather evenly dyed in a yellow tone with good light fastness properties.

APPLICATION EXAMPLE E (cotton)

To a dyebath consisting of 3000 parts of demineralised water, 2 parts of sodium carbonate and 1 part of the dyestuff of Example 2, 100 parts of pre-wetted cotton fabric are added at 30°. After the addition of 10 parts of sodium sulphate, the dyebath is heated to the boil within 30 minutes whereby, at a temperature of 50° and 70°, at each of these stages a further 10 parts of sodium sulphate are added. Dyeing is continued for a further 15 minutes at the boil followed by the addition of a further 10 parts of sodium sulphate. The dyebath is then cooled down. At 50° the dyed fabric is removed from the dye liquor, rinsed with water and dried at 60°. A neutral-yellow cotton dyeing is obtained having good light and wet fastness properties.

APPLICATION EXAMPLE F (polyamide)

0.1 Part of the dyestuff of Example 2 are dissolved in 300 part of water, and 0.2 part of ammonium sulphate are added to this solution. Then the pre-wetted textile fabric (5 parts wool gaberdine or 5 parts nylon satin) is entered into the bath which is heated to the boil during the course of 30 minutes. The water that evaporates during the dyeing process for 30 minutes is replaced, and dyeing at the boil is continued for a further 30 minutes. Finally, the dyed fabric is removed from the liquor and rinsed with water. After drying a neutral-yellow polyamide dyeing is obtained having good light and wet fastness properties.

In analogous manner as described in Application Examples D to F the dyestuffs of the remaining examples may be used for dyeing. The thus obtained substrates are dyed a yellow tone and have good fastness properties.

What is claimed is:

1. A compound of the formula

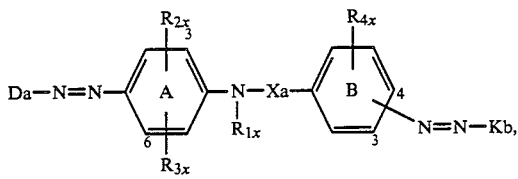

or a salt thereof, wherein
Da is

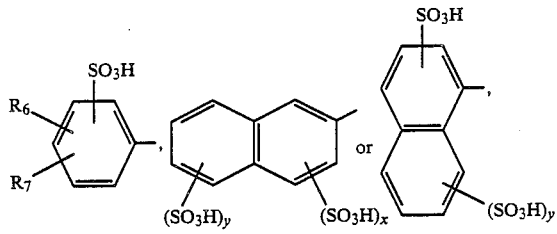

wherein
$R_6$ is hydrogen or sulfo,
$R_7$ is hydrogen, halo, $C_{1-4}$alkyl, $C_{1-4}$alkoxy or ($C_{1-4}$alkyl)carbonylamino,
x is 0 or 1, and
y is 1 or 2,
Kb is

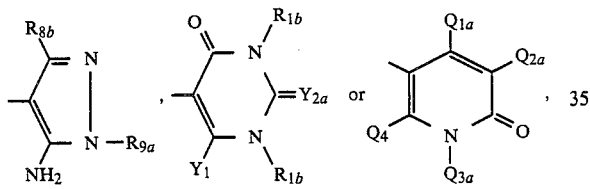

wherein
$Q_{1a}$ is hydrogen; cyano; amino; hydroxy; methyl; ethyl; 2-hydroxyethyl; 2-($C_{1-2}$alkoxy)ethyl; methoxy; ethoxy; cyclohexyl; phenyl; phenyl substituted by 1 or 2 substituents selected from methyl, methoxy, chloro, carboxy and sulfo; phenyl($C_{1-2}$alkyl); phenyl($C_{1-2}$alkyl) the phenyl group of which is substituted by 1 or 2 substituents selected from methyl, methoxy, chloro, carboxy and sulfo; pyridiniummethyl; —CO—$R_{10a}$ or —($CH_2$)$_r$—$R_{11a}$, wherein
$R_{10a}$ is hydroxy, amino, methoxy or ethoxy,
$R_{11a}$ is cyano, chloro, sulfo, —O—$SO_3H$, pyridyl or —CO—$R_{12a}$, wherein $R_{12a}$ is hydroxy, amino, methyl, ethyl, methoxy or ethoxy, and
$Q_{2a}$ is hydrogen; cyano; chloro; sulfo; —$NR_{13b}R_{14b}$; methyl; ethyl; $C_{1-2}$alkyl monosubstituted by hydroxy, phenyl, sulfo or —O—$SO_3H$; —CO—$R_{15a}$; —$CH_2$—NHCO—$R_{16a}$—$E_{1b}$; pyridinium; pyrimidinium,; benzoimidazolium; or pyridinium, pyrimidinium or benzoimidazolium monosubstituted by methyl, amino, methylamino or dimethylamino, wherein
$E_{1b}$ is hydrogen, chloro, —$NR_{23a}R_{24a}$, —$N^{\oplus}R_{25a}R_{26a}R_{27a}$ or sulfo,
each of $R_{13b}$ and $R_{14b}$ is independently hydrogen, methyl or —CO—$R_{16a}$—$E_{1b}$, wherein $E_{1b}$ is as defined above, and $R_{15a}$ is hydroxy, amino methylamino, dimethylamino, methyl, ethyl, methoxy or ethoxy, or
$Q_{1a}$ and $Q_{2a}$ taken together are —$CH_2$—$Y_3$—$CH_2$—, wherein $Y_3$ is —($CH_2$)$_r$—,

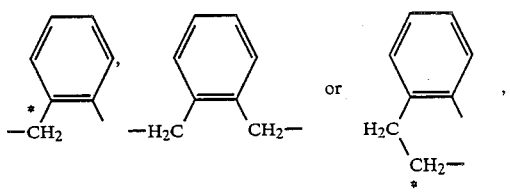

and the * denotes the carbon atom attached to the —$CH_2$— radical in the $Q_{1a}$-position,
$Q_{3a}$ is hydrogen; —$NR_{18a}R_{19a}$; phenyl; phenyl($C_{1-2}$alkyl); cyclohexyl; $C_{1-4}$alkyl; $C_{1-4}$alkyl monosubstituted by hydroxy, cyano, $C_{1-2}$alkoxy, —CO—$R_{20a}$, sulfo or —O—$SO_3H$; —$R_{16b}$—$E_{2a}$;

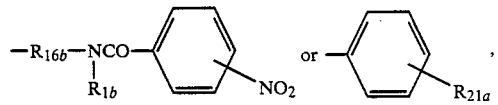

wherein $E_{2a}$ is —$NR_{23}R_{24}$, —$NR^{\oplus}R_{25}R_{26}R_{27}$

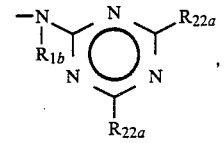

wherein
each $R_{22a}$ is independently chloro or —$N(R_{30})_2$,
$R_{16b}$ is linear or branched $C_{1-3}$alkylene,
each of $R_{18a}$ and $R_{19a}$ is independently hydrogen, methyl, ethyl or phenyl,
$R_{20a}$ is hydroxy, methoxy or ethoxy, and
$R_{21a}$ is —$NR_{23}R_{24}$, —$N^{\oplus}R_{25}R_{26}R_{27}$, —NHCO—$R_{16a}$—$NR_{23}R_{24}$, —NHCO—$R_{16a}$—$N^{\oplus}R_{25}R_{26}R_{27}$, —$SO_2NH$—$R_{16a}$—$NR_{23}R_{24}$, —$SO_2NH$—$R_{16a}$—$N^{\oplus}R_{25}R_{26}R_{27}$, —CONH—$R_{16a}$—$NR_{23}R_{24}$ or —CONH—$R_{16a}$—$N^{\oplus}R_{25}R_{26}R_{27}$,
$Q_4$ is hydrogen or hydroxy, with the proviso that $Q_4$ is hydrogen when $Q_{1a}$ is hydroxy,
$R_{8b}$ is methyl, carboxy or —$CONH_2$,
$R_{9a}$ is hydrogen, methyl, phenyl or phenyl substituted by 1 or 2 substituents selected from $C_{1-4}$alkyl, $C_{1-4}$alkoxy, chloro, acetamido, —NHCO—$R_{1-6}$—$NR_{23}R_{24}$, —NHCO—$R_{16}$—$N^{\oplus}R_{25}R_{26}R_{27}$, —$SO_2NH$—$R_{16}$—$NR_{23}R_{24}$, —$SO_2NH$—$R_{1-6}$—$N^{\oplus}R_{25}R_{26}R_{27}$, carboxy and sulfo, wherein $R_{16}$ is linear or branched $C_{1-6}$alkylene,
$Y_1$ is hydroxy or amino, and
$Y_{2a}$ is =O, =S, =NH, =NCN or =$NCONH_2$,
$R_{1x}$ is hydrogen, $C_{1-4}$alkyl or $C_{1-4}$alkyl monosubstituted by hydroxy, chloro, cyano, carboxy or sulfo,
each of $R_{2x}$ and $R_{3x}$ is independently hydrogen, halo, $C_{1-4}$alkyl, sulfo($C_{1-4}$alkyl), —($CH_2$)$_r$—$NR_{23a}R_{24a}$, —($CH_2$)$_r$—$N^{\oplus}R_{25a}R_{26a}R_{27a}$, $C_{1-4}$alkoxy, sulfo($C_{1-4}$alkoxy), —NHCO—$R_{5x}$, —$NR_{23a}R_{24a}$, —$N^{\oplus}R_{25a}R_{26a}R_{27a}$ or sulfo, wherein $R_{5x}$ is $C_{1-4}$alkyl, —($CH_2$)$_r$—$NR_{23a}R_{24a}$, —($CH_2$)$_r$—$N^{\oplus}R_{25a}R_{26a}R_{27a}$, $C_{1-4}$alkoxy or amino, with the proviso that $R_{2x}$ is other than sulfo, $R_{4x}$ is hydrogen, $C_{1-4}$alkyl, $C_{1-4}$alkoxy, halo, nitro or sulfo, and Xa is —CO—, —CH$_2$—, —SO$_2$—, —CONR$_{1x}$— or

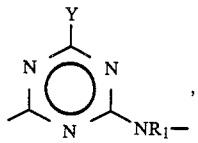

wherein $Y_x$ is hydroxy, $C_{1-4}$alkoxy, phenoxy, amino, $C_{1-2}$alkylamino, $C_{2-4}$hydroxyalkylamino, N,N-di-($C_{2-4}$hydroxyalkyl)amino, —NH—(CH$_2$)$_m$—SO$_3$H, anilino, morpholino, piperidino, piperazino or N-methylpiperazino, wherein m is 2 or 3, and $R_{1x}$ is as defined above, wherein each $R_{1b}$ is independently hydrogen, methyl or ethyl, each $R_{16a}$ is independently $C_{1-2}$alkylene, each $R_{23}$ and $R_{24}$ is independently hydrogen, $C_{1-2}$alkyl, n-$C_{2-3}$hydroxyalkyl or benzyl, or —NR$_{23}$R$_{24}$ is pyrrolidino, piperidino, morpholino, piperazino or N-methylpiperazino, each $R_{23a}$ and $R_{24a}$ is independently hydrogen, methyl or ethyl, or —NR$_{23a}$R$_{24a}$ is piperidino, morpholino, piperazino or N-methylpiperazino, each $R_{25}$ and $R_{26}$ is independently $C_{1-2}$alkyl, n-$C_{2-3}$hydroxyalkyl or benzyl, and each $R_{27}$ is independently methyl, ethyl or benzyl, or —N⊕R$_{25}$R$_{26}$R$_{27}$ is pyridinium, pyridinium monosubstituted or disubstituted by methyl or

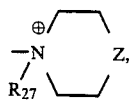

wherein

Z is a direct bond, —CH$_2$—, —O—, —NH— or —N(CH$_3$)—, and $R_{27}$ is as defined above, each $R_{25a}$, $R_{26a}$ and $R_{27a}$ is independently methyl or ethyl, or —N⊕R$_{25a}$R$_{26a}$R$_{27a}$ is pyridinium, pyridinium monosubstituted or disubstituted by methyl or

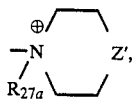

wherein

Z' is —CH$_2$—, —O—, —NH— or —N(CH$_3$)—, and $R_{27a}$ is as defined above, each $R_{30}$ is independently hydrogen, $C_{1-2}$alkyl or $C_{1-2}$alkyl monosubstituted by hydroxy, cyano or $C_{1-2}$alkoxy, each r is independently 1 or 2, each t is independently 1, 2 or 3, and each halo is independently fluoro, chloro or bromo, with the provisos that the compound contains 1, 2, 3 or 4 sulfo groups, the total number of sulfo and carboxy groups equals or exceeds the total number of basic and cationic groups, and the positive charge of each cationic group independently is balanced by the negative charge of an —SO$_3^\ominus$ or —COO$^\ominus$ group of the molecule or of a non-chromophoric anion, or a mixture of such compounds each of which is in free acid or salt form.

2. A compound according to claim 1, or a salt thereof.

3. A compound according to claim 2, or a salt thereof, wherein Xa is —CO—, —CH$_2$—, —CO—NR$_{1a}$— or

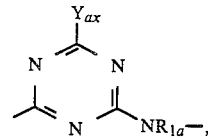

wherein $R_{1a}$ is hydrogen, methyl, ethyl or $C_{1-3}$alkyl monosubstituted by hydroxy, chloro, cyano, carboxy or sulfo, and $Y_{ax}$ is hydroxy, methoxy, amino, $C_{1-2}$-alkylamino, $C_{2-4}$hydroxyalkylamino, N,N-di-($C_{2-4}$hydroxyalkyl)amino, —NH—(CH$_2$)$_m$—SO$_3$H, anilino, morpholino, piperidino, piperazino or N-methylpiperazino, wherein m is 2 or 3.

4. A compound according to claim 2, or a salt thereof, wherein Xa is —CO—, —SO$_2$— or

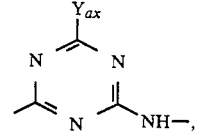

wherein $Y_{ax}$ is hydroxy, methoxy, amino, $C_{1-2}$alkylamino, $C_{2-4}$hydroxyalkylamino, N,N-di-($C_{2-4}$hydroxyalkyl)amino, —NH—(CH$_2$)$_m$—SO$_3$H, anilino, morpholino, piperidino, piperazino or N-methylpiperazino, wherein m is 2 or 3.

5. A compound according to claim 2, or a salt thereof, wherein each $R_{1x}$ is independently hydrogen, methyl, ethyl or $C_{1-3}$alkyl monosubstituted by hydroxy, chloro, cyano, carboxy or sulfo.

6. A compound according to claim 2, or a salt thereof, wherein $R_{2x}$ is in the 6-position of Ring A, and $R_{3x}$ is in the 3-position of Ring A.

7. A compound according to claim 6, or a salt thereof, wherein $R_{2x}$ is hydrogen, methyl, methoxy, acetamido or —NHCONH$_2$, and $R_{3x}$ is hydrogen, methyl or methoxy.

8. A compound according to claim 2, or a salt thereof, wherein the Kb—N=N— group is in the 3- or 4-position of Ring B.

9. A compound according to claim 2, or a salt thereof, wherein Da is 4,8-disulfonaphthyl-2, 6,8-disulfonaphthyl-2 or

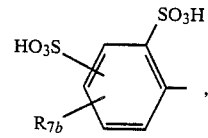

wherein $R_{7b}$ is hydrogen, methyl or methoxy, and Xa is —CO— or

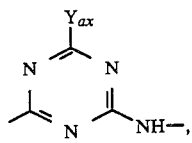

wherein $Y_{ax}$ is hydroxy, methoxy, amino, $C_{1-2}$-alkylamino, $C_{2-4}$hydroxyalkylamino, N,N-di($C_{2-4}$hydroxyalkyl)amino, —NH—$(CH_2)_m$—$SO_3H$, anilino, morpholino, piperidino, piperazino, or N-methylpiperazino, wherein m is 2 or 3.

10. A compound according to claim 1, or a salt thereof, wherein Kb is

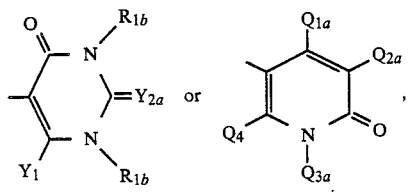

or a mixture of such compounds each of which is in free acid or salt form.

11. A compound according to claim 1, or a salt thereof.

12. A compound according to claim 11, or a salt thereof, wherein the Kb—N=N— group is in the 3- or 4-position of Ring B.

13. A compound according to claim 12, or a salt thereof, wherein Xa is —CO—, —$CH_2$—, —$CONR_{1a}$— or

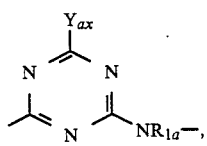

wherein
$R_{1a}$ is hydrogen, methyl, ethyl or $C_{1-3}$alkyl monosubstituted by hydroxy, chloro, cyano, carboxy or sulfo, and $Y_{ax}$ is hydroxy, methoxy, amino, $C_{1-2}$-alkylamino, $C_{2-4}$hydroxyalkylamino, N,N-di-($C_{2-4}$hydroxyalkyl)amino, —NH$(CH_2)_m$—$SO_3H$, anilino, morpholino, piperidino, piperazino or N-methylpiperazino, wherein m is 2 or 3.

14. A compound according to claim 11, or a salt thereof, wherein
each $R_{1x}$ is independently hydrogen, methyl, ethyl or $C_{1-3}$alkyl monosubstituted by hydroxy, chloro, cyano, carboxy or sulfo,
$R_{2x}$ is hydrogen, chloro, methyl, methoxy, —NH-CO—$R_{5a}$, —$(CH_2)_t$—$SO_3H$, —O—$(CH_2)_3$—$SO_3H$, —$(CH_2)_t$—$NR_{23a}R_{24a}$ or —$(CH_2)_t$—$N^{\oplus}R_{25a}R_{26a}R_{27a}$, wherein $R_{5a}$ is methyl, methoxy, amino, —$(CH_2)_t$—$NR_{23a}R_{24a}$ or —$(CH_2)_t$—$N^{\oplus}R_{25a}R_{26a}R_{27a}$,
$R_{3x}$ is hydrogen, methyl or methoxy, and
$Y_x$ is hydroxy, methoxy, amino, $C_{1-2}$alkylamino, $C_{2-4}$hydroxyalkylamino, N,N-di-($C_{2-4}$hydroxyalkyl)amino, —NH—$(CH_2)_m$—$SO_3H$, anilino, morpholino, piperidino, piperazino or N-methylpiperazino.

15. A compound according to claim 14, or a salt thereof, wherein
$R_{2x}$ is in the 6-position of Ring A, and
$R_{3x}$ is in the 3-position of Ring A.

16. A compound according to claim 14, or a salt thereof, wherein $R_{2x}$ is hydrogn, methyl, methoxy, acetamido or —$NHCONH_2$.

17. A compound according to claim 16, or a salt thereof, wherein the Kb—N=N— group is in the 3- or 4-position of Ring B.

18. A compound according to claim 17, or a salt thereof, wherein Kb is

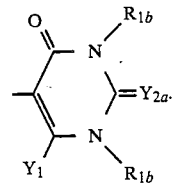

19. A compound according to claim 17, or a salt thereof, wherein Kb is

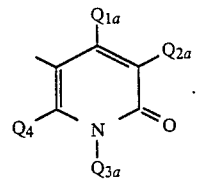

20. A compound according to claim 17 having the formula

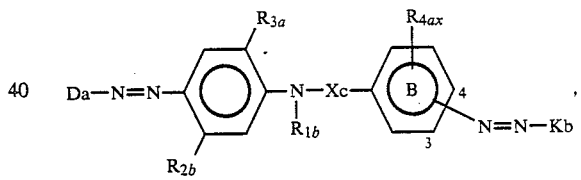

or a salt thereof, wherein
$R_{2b}$ is hydrogen, methyl, methoxy, acetamido or —$NHCONH_2$,
$R_{3a}$ is hydrogen, methyl or methoxy,
$R_{4ax}$ is hydrogen, $C_{1-2}$alkyl, $C_{1-2}$alkoxy or sulfo, and
$X_c$ is —CO—, —$SO_2$— or

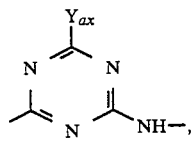

wherein Yax is hydroxy, methoxy, amino, $C_{1-2}$alkylamino, $C_{2-4}$hydroxyalkylamino, N,N-di-($C_{2-4}$hydroxyalkyl)amino, —NH—$(CH_2)_m$—$SO_3H$, anilino, morpholino, piperidino, piperazino or N-methylpiperazino,
with the provisos that the compound contains 1, 2, 3 or 4 sulfo groups and the number of sulfo groups equals or exceeds the total number of basic and cationic groups.

21. A compound according to claim 20, or a salt thereof, wherein Xc is

—CO—or 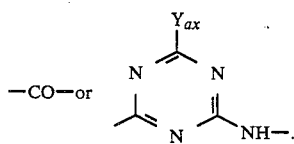

22. A compound according to claim 20, or a salt thereof, wherein Da is 1,5-, 3,6-, 4,8-, 5,7- or 6,8-disulfonaphthyl-2, 3,6,8- or 4,6,8-trisulfonaphthyl-2, 3,6-, 4,6-, 3,8- or 4,8-disulfonaphthyl-1, 3,6,8-trisulfonaphthyl-1 or

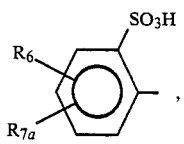

wherein $R_{7a}$ is hydrogen, chloro, methyl, methoxy or acetamido.

23. A compound according to claim 20, or a salt thereof, wherein $R_{1b}$ is hydrogen.

24. A compound according to claim 20, or a salt thereof, wherein $R_{4ax}$ is hydrogen.

25. A compound according to claim 20, or a salt thereof, wherein Xc is —CO—.

26. A compound according to claim 20, or a salt thereof, wherein the Kb—N=N— group is in the 4-position of Ring B.

27. A compound according to claim 26, or a salt thereof, wherein
$R_{1b}$ is hydrogen,
$R_{4ax}$ is hydrogen, and
Xc is —CO—.

28. A compound according to claim 27, or a salt thereof, wherein Kb is

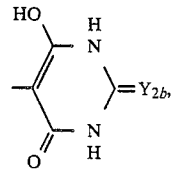

wherein
$Y_{2b}$ is =NCN or =NCONH$_2$.

29. The compound according to claim 28 having the formula

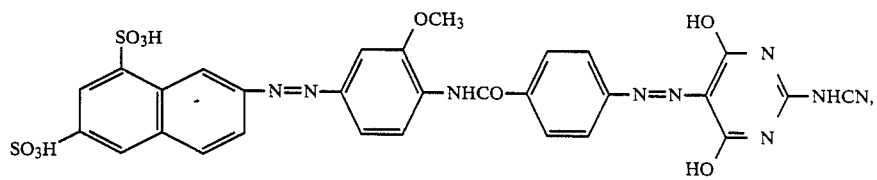

or a salt thereof.

30. The compound according to claim 29 in sodium salt form.

31. The compound according to claim 28 having the formula

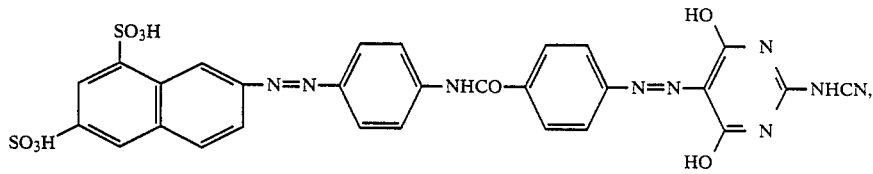

or a salt thereof.

32. A storage-stable, liquid aqueous dyeing preparation containing a compound according to claim 1, in water-soluble salt form.

* * * * *